(12) United States Patent
Ouderkirk et al.

(10) Patent No.: US 9,039,905 B2
(45) Date of Patent: May 26, 2015

(54) METHOD OF FORMING A LIGHTING SYSTEM

(71) Applicant: 3M INNOVATIVE PROPERTIES COMPANY, St. Paul, MN (US)

(72) Inventors: Andrew J. Ouderkirk, St. Paul, MN (US); Erin A. Binder, Afton, MN (US); Nicholas T. Gabriel, Minneapolis, MN (US); Kelly Reed Ingham, Singapore (SG); Wesley A. Raider, Hudson, WI (US); Shrey Gupta, Bangalore, IN (US); Olester Benson, Jr., Woodbury, MN (US); Huang Chin Hung, Yonghe (TW)

(73) Assignee: 3M Innovative Properties Company, St. Paul, MN (US)

( * ) Notice: Subject to any disclaimer, the term of this patent is extended or adjusted under 35 U.S.C. 154(b) by 188 days.

(21) Appl. No.: 13/769,459

(22) Filed: Feb. 18, 2013

(65) Prior Publication Data

US 2013/0213929 A1 Aug. 22, 2013

Related U.S. Application Data

(60) Provisional application No. 61/599,976, filed on Feb. 17, 2012.

(51) Int. Cl.
*B29D 11/00* (2006.01)
*F21V 8/00* (2006.01)

(52) U.S. Cl.
CPC ........ *B29D 11/00721* (2013.01); *G02B 6/0028* (2013.01); *G02B 6/0031* (2013.01); *G02B 6/0036* (2013.01); *G02B 6/0065* (2013.01)

(58) Field of Classification Search
CPC .......... B29D 11/00721; G02B 6/0028; G02B 6/0065; G02B 6/0036; G02B 6/0031
USPC .............................. 216/24; 264/1.24; 156/245
See application file for complete search history.

(56) References Cited

U.S. PATENT DOCUMENTS

| | | | |
|---|---|---|---|
| 6,862,141 B2 | 3/2005 | Olczak | |
| 7,091,653 B2 | 8/2006 | Ouderkirk | |
| 7,180,672 B2 | 2/2007 | Olczak | |
| 2003/0112523 A1* | 6/2003 | Daniell | 359/626 |
| 2005/0194351 A1 | 9/2005 | Yu | |
| 2008/0070129 A1 | 3/2008 | Liu | |
| 2009/0067151 A1 | 3/2009 | Sahlin | |
| 2009/0278269 A1 | 11/2009 | Chuang | |
| 2009/0316431 A1 | 12/2009 | Nagata | |
| 2012/0020081 A1* | 1/2012 | Goto et al. | 362/235 |
| 2012/0043573 A1* | 2/2012 | Mitsuishi et al. | 257/98 |

FOREIGN PATENT DOCUMENTS

| | | |
|---|---|---|
| EP | 1557700 | 7/2005 |
| TW | 200807091 | 2/2008 |

(Continued)

*Primary Examiner* — Nadine Norton
*Assistant Examiner* — Mahmoud Dahimene
(74) *Attorney, Agent, or Firm* — Gregg H. Rosenblatt

(57) ABSTRACT

A method of forming a lighting system comprises providing a cavity having at least a first array of first optical elements and a second array of second optical elements that have a different shape than the first array, filling the cavity with a curable resin, applying a secondary optical element to the curable resin in alignment with the first optical array, curing the resin to form a cured assembly, and removing the cured assembly from the cavity.

20 Claims, 21 Drawing Sheets

(56) References Cited

FOREIGN PATENT DOCUMENTS

| TW | 200829722 | 7/2008 |
|---|---|---|
| TW | 200946327 | 11/2009 |
| WO | WO 2004-061536 | 7/2004 |
| WO | WO 2009-101883 | 8/2009 |
| WO | WO 2009-107533 | 9/2009 |

* cited by examiner

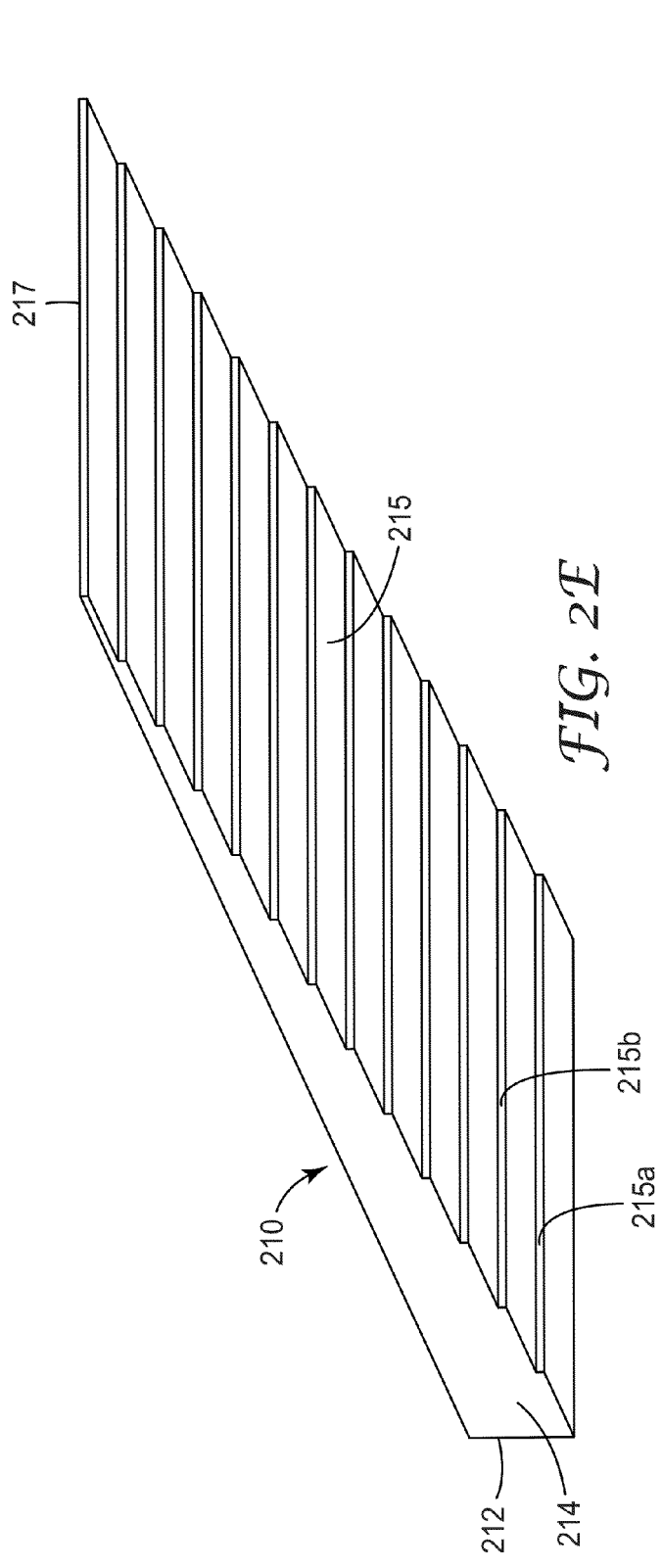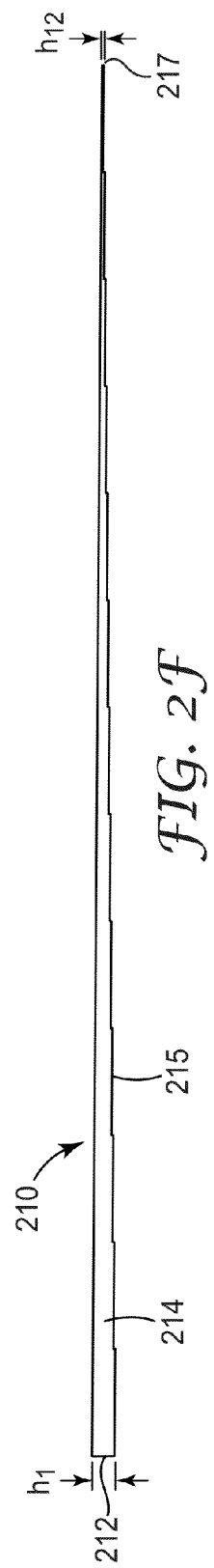

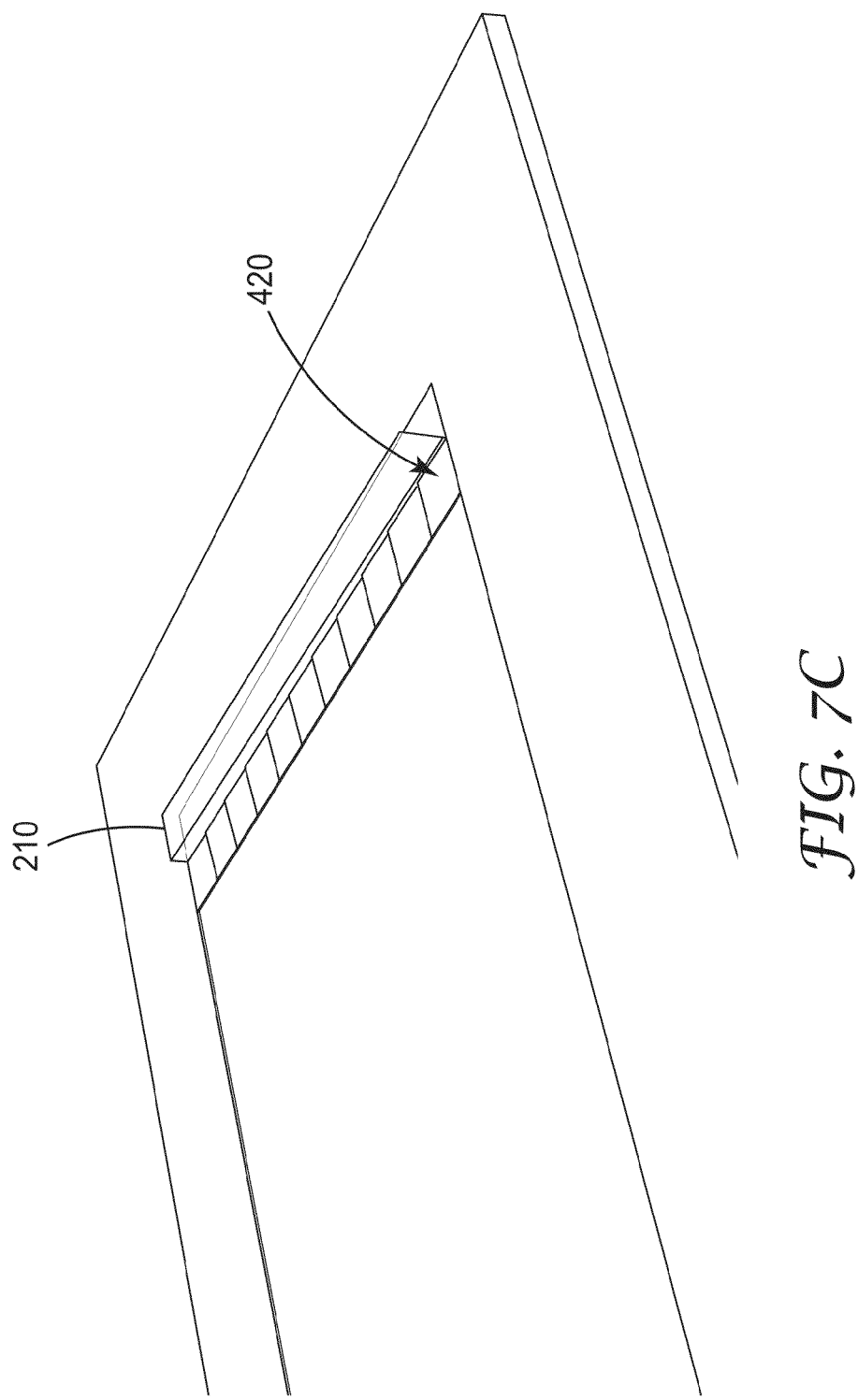

METHOD OF FORMING A LIGHTING SYSTEM

THE FIELD OF THE INVENTION

The present invention relates generally to a lighting system and more specifically to a method of forming a lighting system and components thereof.

BACKGROUND OF THE INVENTION

Light guides are used in conjunction with light sources, such as light emitting diodes (LEDs), for a wide variety of lighting applications. In one particular application, light guides are commonly used to provide illumination for LCD displays. The light source(s) typically emit light into the light guide, particularly in cases where a very thin profile backlight guide is desired, as in laptop computer displays. The light guide is a clear, solid, and relatively thin plate whose length and width dimensions are on the order of the backlight output area. The light guide uses total internal reflection (TIR) to transport or guide light from the edge-mounted lamps across the entire length or width of the light guide to the opposite edge of the backlight, and a non-uniform pattern of localized extraction structures is provided on a surface of the light guide to redirect some of this guided light out of the light guide toward the output area of the backlight. Such backlights typically also include light management films, such as a reflective material disposed behind or below the light guide, and a reflective polarizing film and prismatic brightness enhancement film(s) (BEF) disposed in front of or above the light guide, to increase on-axis brightness.

Since most commonly used light sources such as LEDs have a relatively large height and range of emission angles, the thickness of the light guide is usually correspondingly thick to efficiently couple light. A conventional illuminating device for a liquid crystal display is described in US Publication No. 2009/0316431. Conventional illumination devices couple light from a source to a planar light guide. The light guide typically is about the same height as the source, since reducing the height of the light guide will reduce the coupling efficiency from the light source to the light guide.

A significant disadvantage of typical film or plate light guides, however, is the mis-match between the small aspect ratio of LEDs and the very high aspect ratio of light guides. LEDs have a typical aspect ratio of about 1:1 to about 4:1, whereas edge light guides can have an aspect ratio from about 20:1 to as much as about 100:1 or more. This mis-match usually results in the light in the light guide having a much higher etendue, also referred to as throughput, than the light emitted from the LEDs. This high etendue in turn results in an increased thickness being required for the light guide, as well as the light guide requiring air interfaces on one or more of the faces. As a result, the light guide may be thicker than the liquid crystal display module, and the air interfaces may limit certain applications, such as touch and haptic applications.

SUMMARY

In an aspect of the invention, a method of forming a lighting system comprises providing a cavity having at least a first array of first optical elements and a second array of second optical elements that have a different shape than the first array. The cavity is filled with a curable resin. A secondary optical element is applied to the curable resin in alignment with the first optical array. The resin is cured to form a cured assembly. The cured assembly is then removed from the cavity.

In another aspect of the invention, a method of forming an extractor optical element having extraction features comprises providing a substrate material having a surface having an array of grooves formed thereon. The grooves are filled with a polymer. The polymer is defined using a patterned radiation and etching process. The substrate material is electroformed to form a replica of the surface with selected portions of the grooves, where the sides of the grooves can have an angle of at least 45 degrees to the plane of the light guide. The substrate is then removed from the electroform.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

Embodiments of the invention are better understood with reference to the following drawings. The elements of the drawings are not necessarily to scale relative to each other.

FIG. 2E is another isometric (bottom side) view of an anamorphic light guide section of a converter unit of a backlight system according to another aspect of the invention.

FIG. 2F is a side view of an anamorphic light guide section of a converter unit of a backlight system according to another aspect of the invention.

FIGS. 7A-7F are several views illustrating an exemplary process to form a backlight system and/or components thereof according to another embodiment of the invention.

Figure 1:
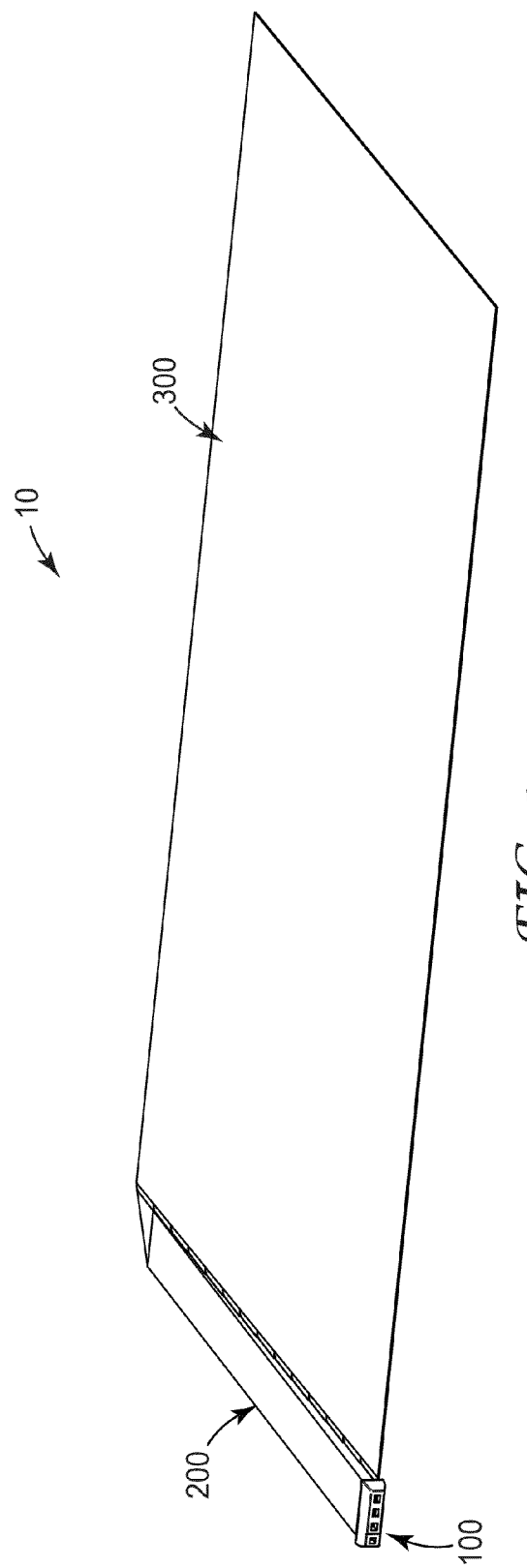
FIG. 1 is an isometric view of an exemplary backlight system according to an aspect of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to a lighting system and more specifically to a backlight system having an anamorphic light guide that provides an efficient lighting system for a display. The backlight system and its components, taken together or separately, are designed to provide a highly efficient lighting system with low etendue. In this manner, the number of overall components can be reduced and the need for air spaces can be eliminated, providing the opportunity for pressure sensing touch displays and haptics. The backlight system has several advantages, including being thinner, allowing lamination with an optically clear adhesive (OCA), and eliminating or reducing the need for angular enhancement films.

Figure 4:
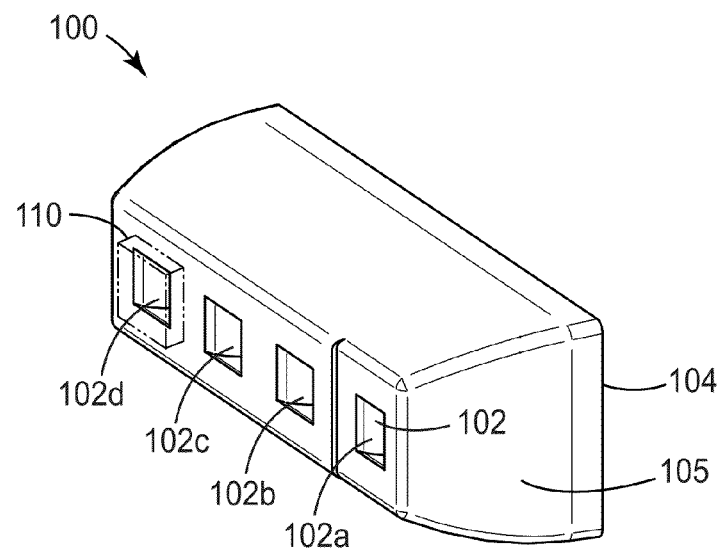
FIG. 4 is an isometric view of an exemplary light source unit according to another aspect of the invention.

FIG. 1 shows an isometric view of an exemplary backlight system 10 that can be used to illuminate a display (not shown), such as an LCD. Backlight system 10 includes a light source unit 100, a converter unit 200, and a backlight light guide unit 300. Light source unit 100, shown in more detail in FIG. 4, provides a source of light for the backlight system 10. Converter unit 200, shown in more detail in FIGS. 2A-2I, includes an anamorphic light guide that guides the light from light source unit 100 into backlight light guide unit 300. Backlight light guide unit 300, shown in further detail in FIGS. 5A-5B, includes a backlight light guide having a plurality of extraction features to provide output light to a display, such as an LCD display. This output light has good uniformity. In addition, the system efficiently couples light from the light source to the display and provides output light that can be partially collimated in at least one axis. As such, the exemplary backlight system 10 can be used as part of a great number of devices and applications, such as transmissive, transflective, and reflective LCDs (laptops, tablets, cell phones, e-readers, etc.), cholesteric, MEMS, and liquid paper devices, signage and conformable graphics, and indicators, such as vehicular displays.

Each of these components will now be described in greater detail. It is noted that each of these components 100, 200, and 300 can be utilized with the other components of the exemplary backlight system of FIG. 1 or with conventional backlight system components.

Regarding the converter unit 200, as shown in FIGS. 2A-2I, the converter unit 200 includes an anamorphic light guide 210 having an input face 212, a diverting section 250, and an orthogonal light confining face 214 that corresponds to the exit plane of the light exiting the converter unit 200. The converter unit 200 converts light emitted from the light source 100, which has an aspect ratio of less than about 10:1, such as about 1:1 to about 1:2, into a line-shaped output light beam, having an aspect ratio greater than 10:1, such as an aspect ratio of about at least 20:1, preferably about at least 50:1, or preferably about at least 100:1. FIG. 3A shows an illustration of the cross section of an exemplary light beam 262 entering the converter unit 200 having an aspect ratio (X:Y) of about 1:1. FIG. 3B shows an illustration of the cross section of an exemplary light beam 264 exiting the converter unit 200 having an aspect ratio (X:Y) of about 50:1. In one preferred aspect, the converter unit converts light emitted from the light source into a line-shaped output light beam having an aspect ratio greater than the light source aspect ratio by at least a factor of four.

Input face 212 receives light from light source unit 100, described in further detail below. Light is passed through the converter unit 200 into a coupler 280 (which can be separate from or part of converter unit 200), also described in further detail below, or alternatively, directly into backlight light guide unit 300. In one aspect, such as is shown in FIGS. 2D, 2E, and 2F, the light guide 210 is a generally rectilinear structure having input surface 212, top surface 213, orthogonal surface 214, opposite orthogonal surface 216, bottom surface 215, and end surface 217. Surface 215 comprises a stepped surface, such that the height of light guide 210 decreases along the length L from surface 212 (having a height=h1) to opposite, end surface 217 (having a height=h2, where h2<<h1). In one example, for mobile unit backlight applications, h1 can be about 1 mm, the width can be about 2 mm, and L can be about 50 mm to about 150 mm. In another example, for television and larger size display applications, h1 can be about 5 mm, the width can be about 10 mm, and L can be from about 500 mm to about 1000 mm.

In one aspect, top surface 213 is approximately orthogonal with respect to input surface 212 and the bottom surface 215 includes a plurality of sloping steps, with each sloping step parallel to the top surface 213. Thus, the light guide 210 can be a generally rectilinear, stepped, and sloped structure and can be formed from an optically clear material such as a polymer (e.g., polycarbonate) or glass.

In addition, the light guide 210 can include a diverting section 250, that can include a plurality of diverting elements (also referred to herein as diverters) 251a, 251b, etc. (see FIGS. 2B and 2C), where each diverting portion changes the direction of the light by approximately 90°. Depending on the size of the backlight light guide unit 300, the number of diverter elements can range from a few (3 or 4) to 20 or more. The diverting elements 251a, 251b, etc. can be integrally formed as part of light guide 210 or they can be separately formed then attached to bottom surface 215 (see e.g., FIG. 2E) of the light guide 210 using an appropriate adhesive or bonding material, such as an optically clear adhesive.

In one aspect, each diverter comprises a coupled or decoupled input face 252, a reflecting face 256 (e.g., faces 256a, 256b, etc. shown in FIG. 2B) that changes the light direction by approximately 90°, and an output face 254 that is coupled or decoupled to a coupling element 280 or the backlight light guide unit 300. Each diverting portion is thin (relative to the size of input face 212), such that each diverter input face captures only a segment of the incoming light and reflects that light segment towards the coupler 280/backlight light guide unit 300. For example, each diverter element can have a thickness of about 30 μm to 200 μm, preferably about 50 μm. Thus, in one aspect, each diverting element is configured as a generally planar right angle prism. As such, in one aspect, the height of the input surface 212 is approximately equal to the sum of heights of all of the diverting structures.

Each diverting element 251a, 251b, etc., may have a mirrored or TIR 45° facet that reflects the incoming light by about a 90° angle. Light is captured within each diverter, as the major faces of the diverter, top face 258 and bottom face 259, are each bounded by a lower index material. For example, bottom face 259 is bounded by air, while top face 258 can be bounded by an optically clear adhesive, having a lower index (e.g., 1.49) than the index of refraction of the light guide 210. Alternatively, there may be a low index coating applied to either surface 215 or to surface 258, or both, and the surfaces coupled to each other. Similarly, surfaces 213 and 259 may be coated with a low index material to allow the material to be bonded to other elements in the display. Suitable low index coatings include silica and magnesium fluoride. In another alternative aspect, the anamorphic light guide 210 may be formed from a material with a lower refractive index than the material used to form the diverter 250. In yet another alternative aspect, the refractive index of the anamorphic light guide may be similar to the refractive index of the diverting element, without a low index material disposed between the two, and the light guide may have a thickness less than the height h1 of the input face of the anamorphic light guide, but greater than the thickness of the diverting section 250.

Figure 2A:
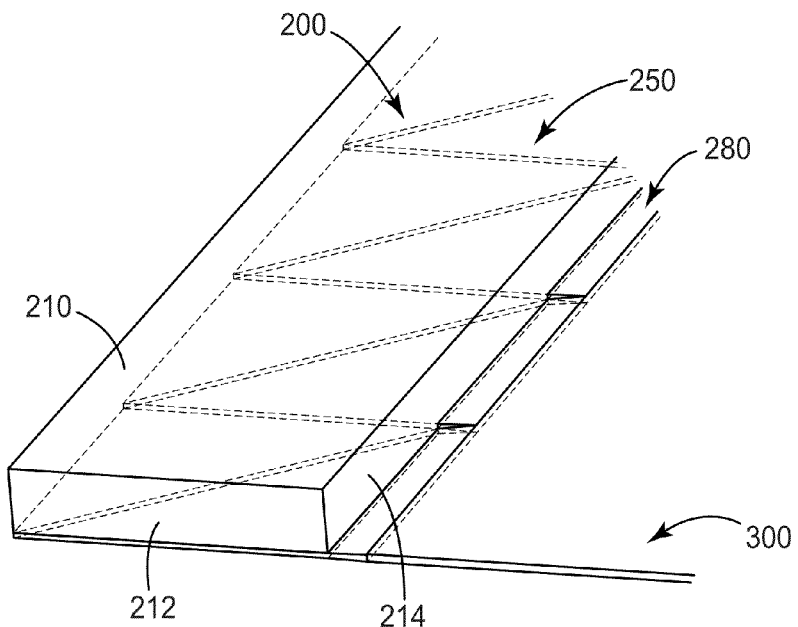
FIG. 2A is an isometric partial view of a converter unit of a backlight system according to another aspect of the invention.
Figure 2B:
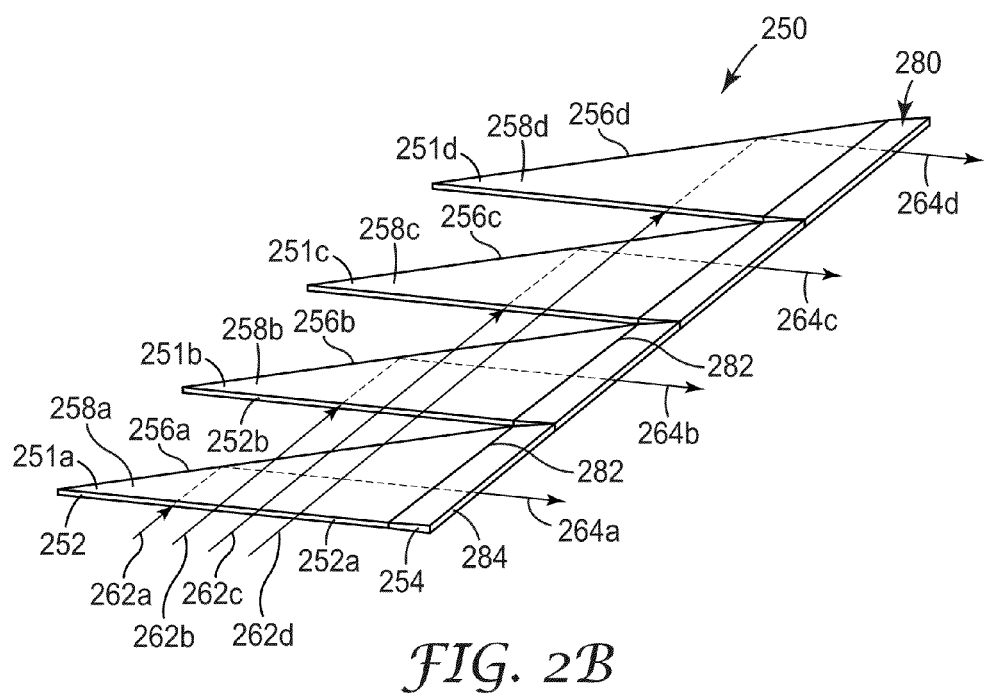
FIG. 2B is an isometric partial view of a diverting section of a converter unit of a backlight system according to another aspect of the invention.
Figure 3A:
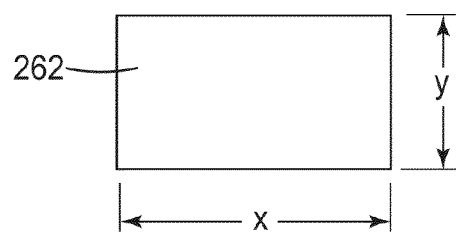
FIG. 3A is an illustration of the cross section of an exemplary light beam entering a converter unit according to an aspect of the invention having an aspect ratio (X:Y) of from about 1:1 to about 2:1.
Figure 3B:
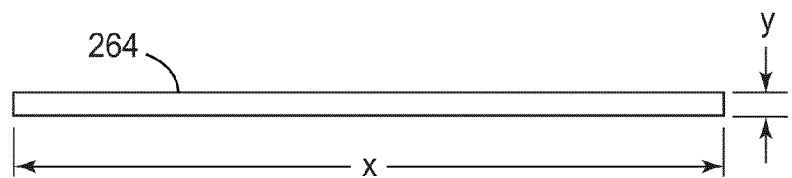
FIG. 3B is an illustration of the cross section of an exemplary light beam exiting a converter unit according to an aspect of the invention having an aspect ratio (X:Y) of about 50:1.

As shown in FIG. 2B, a first input light segment 262a is captured by diverting element 251a. The input light segment is totally internally reflected within diverting element 251a and directed off angled reflecting surface 256a towards output face 254. The input light segment 262a emerges the diverting element as output light segment 264a. Similarly, a second light segment 262b is captured by diverting element 251b, which is axially spaced downstream from diverting element 251a at a height slightly raised above the height of diverting element 251a. The input light segment is totally internally reflected within diverting element 251b and directed off angled reflecting surface 256b towards output face 254. The input light segment 262b emerges the diverting element as output light segment 264b. In a similar manner, each subsequent diverting element captures a segment of the input light and redirects that light segment towards the coupler 280/backlight light guide unit 300. Thus, the output light segments 264a, 264b, etc. form a line shaped beam having a high aspect ratio of at least 20:1 or greater.

Reflecting surfaces 256a, 256b, etc., can be flat or curved surfaces. In addition, in some aspects, the reflecting surfaces 256a, 256b, etc. can be coated with a reflective coating. For example, the reflecting surfaces 256a, 256b, etc. can be coated with a metal or a dielectric layered coating. Alternatively, the reflecting surfaces 256a, 256b, etc. can be simply polished to totally internally reflect (TIR) light.

In construction, for converter units that comprise separately formed light guides and diverting sections, the diverting section 250 can be mated to the light guide 210 on bottom surface 215 using an optically clear adhesive or low index bonding material. In this aspect, diverting element input surface 252a (see FIG. 2B) can be mated with bottom step surface 215a (see FIG. 2E), next diverting element input surface 252b can be mated with next bottom step surface 215b, and so forth. According to alternative aspects, the input face(s) of the diverter(s) 250 may be either optically coupled or decoupled from the light guide 210. Optically coupling the diverter can be more efficient due to reducing Fresnel reflections, but may cause losses with diverters with a 45° facet due to errant paths for the light beam. Therefore, alternatively, when utilizing diverting elements having a 45° facet, the input face may be decoupled from the light guide 210. Similarly, the output face of the diverter elements, e.g., face 254 (shown in FIG. 2B) may be coupled or decoupled from the input face of the coupler 280/backlight light guide unit 300.

Figure 2C:
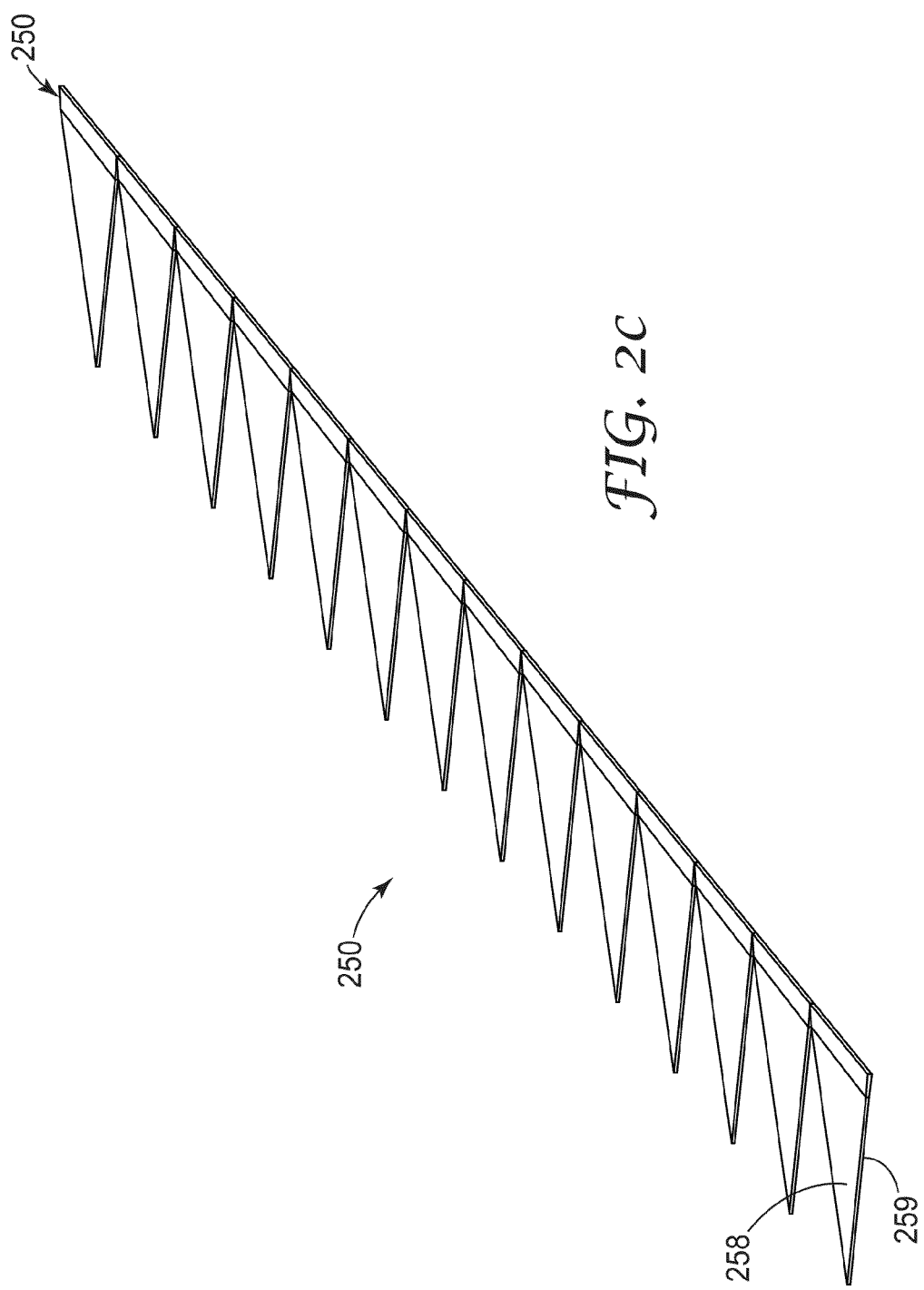
FIG. 2C is another isometric view of a diverting section of a converter unit of a backlight system according to another aspect of the invention.
Figure 2D:
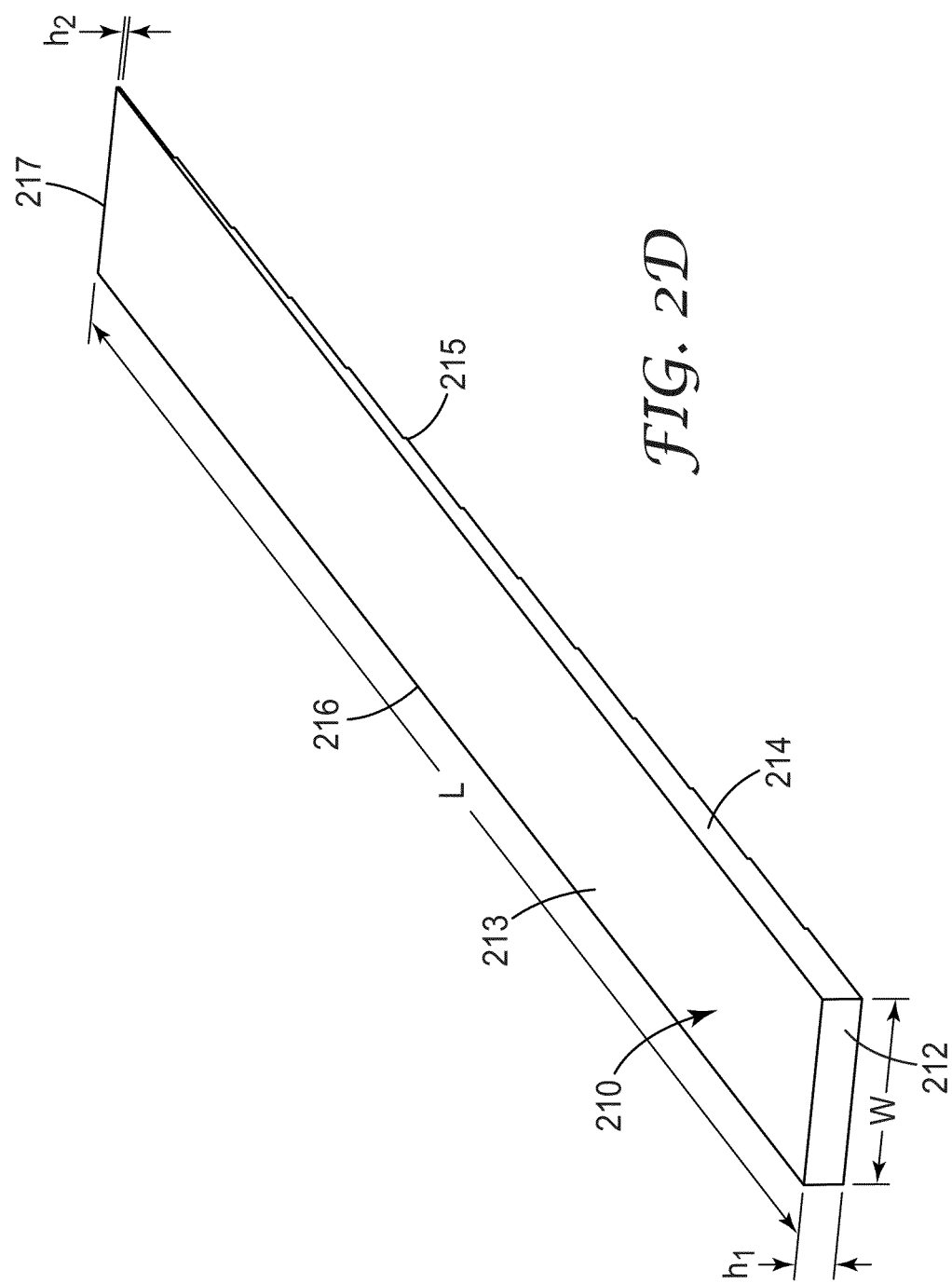
FIG. 2D is an isometric view of an anamorphic light guide section of a converter unit of a backlight system according to another aspect of the invention.

In alternative aspects of the invention, the converter unit 200 can have alternative constructions. For example, as shown in FIG. 2J, converter unit 200' can comprise a stack of films 205a-205g. The films can be stacked one on top of the other, with an intervening layer of an optically clear adhesive or a low index of refraction coating (not shown). Each film can have reflector surface, such as surface 264g, comprising a mirrored or TIR 45° facet that reflects the incoming light (e.g., rays 262a-262g) that enters converter unit 200' via input face 212' by about a 90° angle, such that is diverted and output as rays 264a-264g. As shown in FIG. 2J, the reflecting surfaces are sequentially, axially spaced apart from each other. Alternatively, each layer of film can comprise a series of etched lines formed therein, such as rounded bends, that create diverting channels within each layer of film to channel the incoming light towards the coupler 280/backlight light guide unit 300. In addition, the efficiency of curved light guides can be increased by optically coupling the output face of the diverting section 250 to the input face of the coupler 280/backlight light guide unit 300.

This alternative construction maintains the uniformity of the source in at least one direction—the light source may have a non-uniform intensity of light when illuminating a light guide, and the stack of films maintain the distribution in one axis. The films also allow light to be distributed in the other axis to promote uniformity of the light illuminating the backlight light guide unit 300. As mentioned previously, a low index coating may be interposed between film layers to maintain isolation of light from one film layer to another. Depending on the requirements of the overall display system, this construction can add to overall thickness and can reduce coupling efficiency.

Figure 2G:
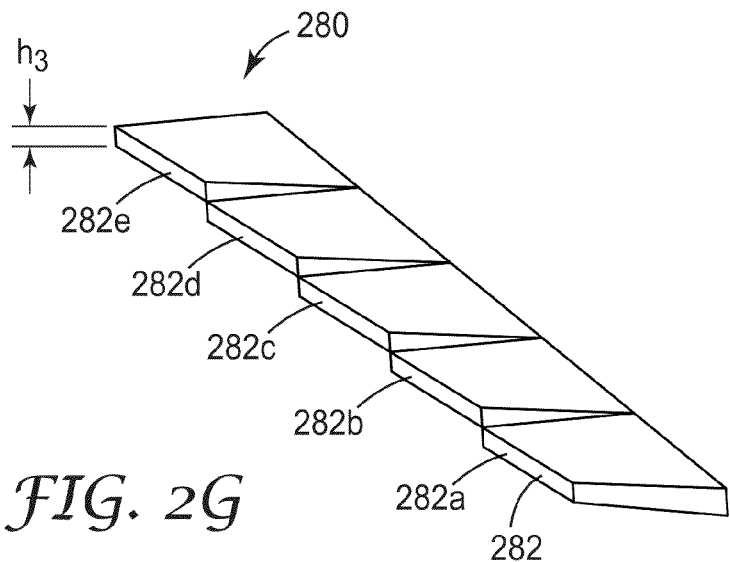
FIG. 2G is an isometric view of a coupling element portion of a backlight system according to another aspect of the invention.
Figure 2H:
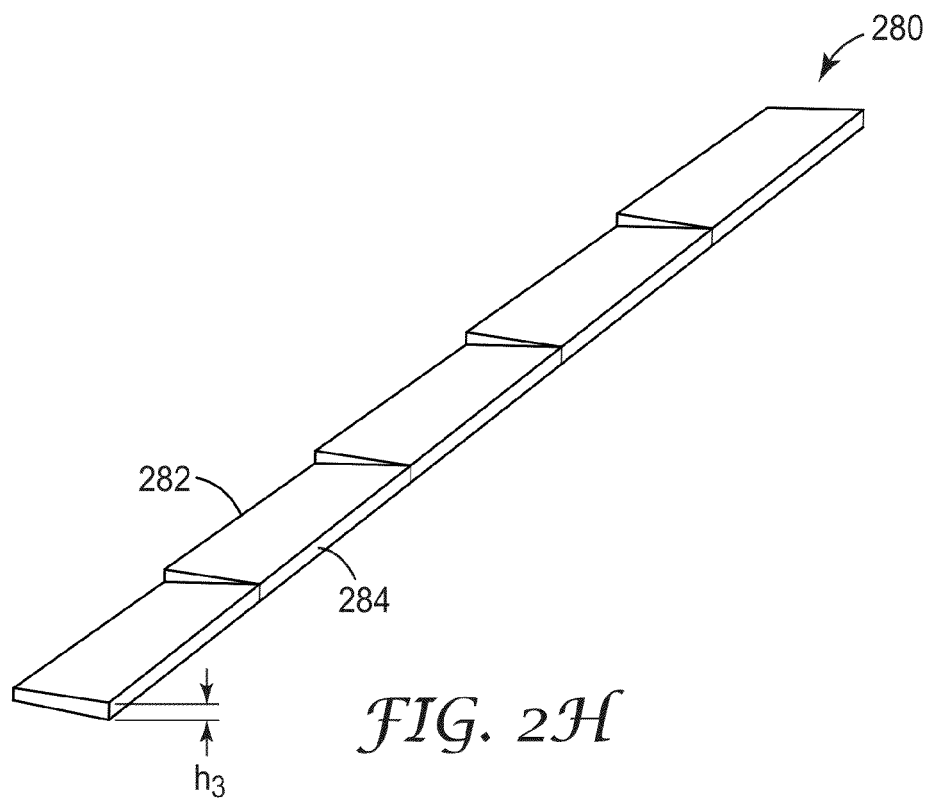
FIG. 2H is another isometric view of a coupling element portion of a backlight system according to another aspect of the invention.
Figure 2I:
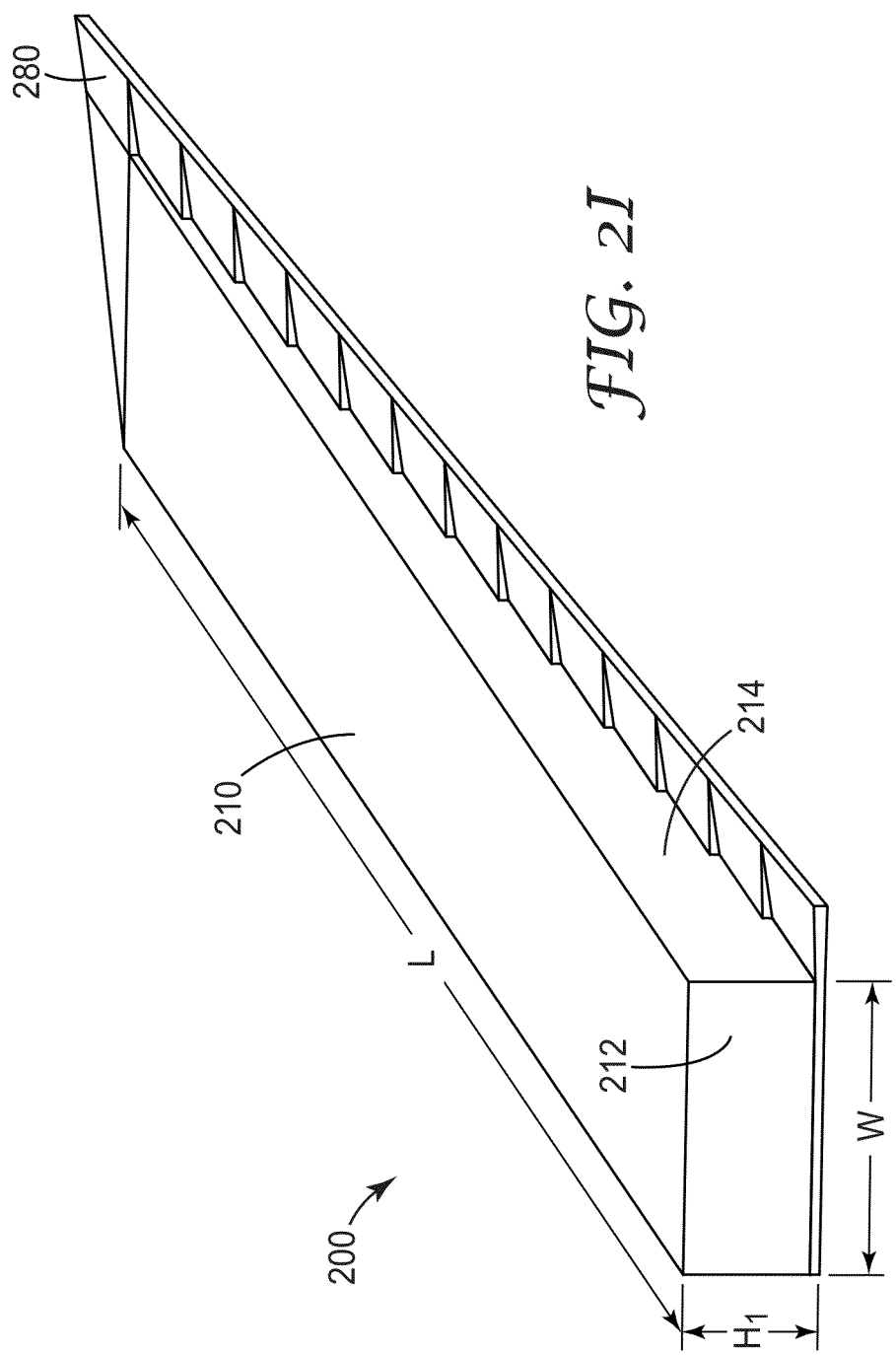
FIG. 2I is another isometric view of a converter unit of a backlight system according to another aspect of the invention.
Figure 2J:
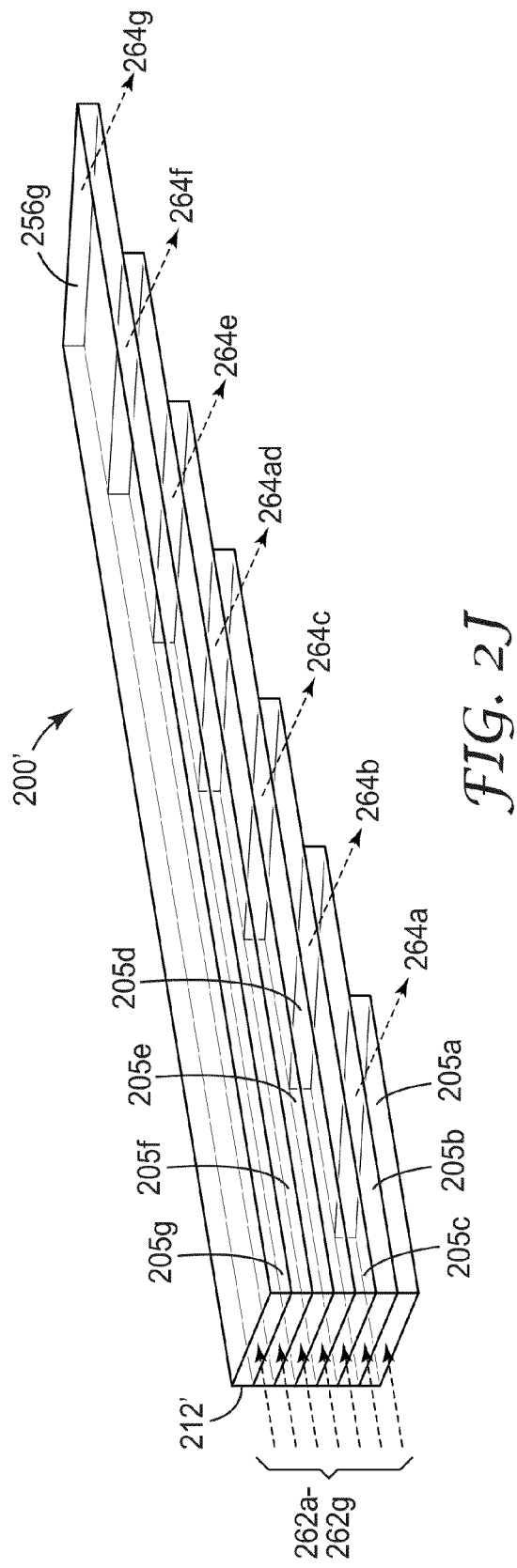
FIG. 2J is an isometric view of an alternative converter unit of a backlight system according to another aspect of the invention.
Figure 2K:
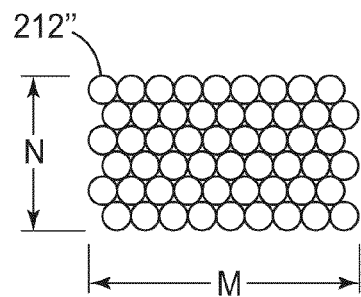
FIG. 2K is a front view of an input face of another alternative converter unit of a backlight system according to another aspect of the invention.
Figure 2L:
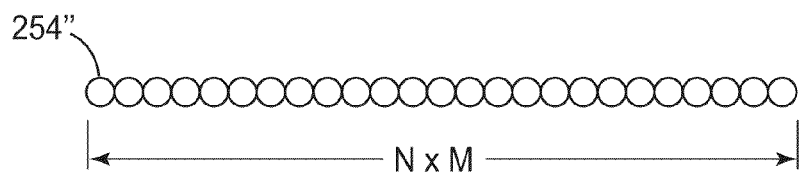
FIG. 2L is a front view of an output face of the alternative converter unit of FIG. 2K.

In another alternative embodiment, as shown in FIGS. 2K and 2L, an alternative converter unit can comprise an array of optical fibers. In this example, input face 212" is shown in FIG. 2K comprising an array of N by M fibers. This input face 212″ is configured to receive light from the light source unit having an aspect ratio of about 1:1. The output face 254″ comprises a single row of N×M fibers, thus providing output light at an aspect ratio of about at least 20:1.

Thus, the converter unit 200 can comprise a rigid or flexible body, with a tapered or non-tapered shape that can convert the aspect ratio of the source by over an order of magnitude.

The above-described converter units are configured to convert the format, or aspect ratio, of the incoming light source into a line. This construction also substantially preserves the etendue of the light source.

Source light can be provided by any number of source types, but a more preferred source is an LED light source.

FIG. 4 shows an exemplary light source unit 100. Light source unit 100 can include a single LED, such as LED 110, two LEDs, or more LEDs, depending on the type of display being illuminated. The output of the LED(s) 110 may be coupled to the converter unit 200 using one or more compound parabolic concentrators 105, lenses (not shown) or a combination thereof. Of course, in alternative embodiments, a lens or a multiple lens system can be utilized to collect and collimate the output of the LED(s).

As shown in FIG. 4, the LED(s) 110 can be mounted on the one or more entrance apertures 102a-102d. While FIG. 4 shows a compound parabolic concentrator (CPC) 105 that is configured to collect and concentrate light from four LEDs, in other aspects of the invention, the CPC 105 can collect and concentrate light from fewer or greater numbers of LEDs. The interior portion of the CPC 105 can be hollow and constructed in the same manner as that of a conventional CPC. The LED light is output from exit aperture 104.

In this regard, "light emitting diode" or "LED" refers to a diode that emits light, whether visible, ultraviolet, or infrared, where the emitted light will have a peak wavelength in a range from about 430 to 700 nm. The term LED includes incoherent light sources that are encased or encapsulated semiconductor devices marketed as "LEDs", whether of the conventional or super radiant variety, as well as coherent semiconductor devices such as laser diodes, including but not limited to vertical cavity surface emitting lasers (VCSELs). An "LED die" is an LED in its most basic form, i.e., in the form of an individual component or chip made by semiconductor processing procedures. For example, the LED die may be formed from a combination of one or more Group III elements and of one or more Group V elements (III-V semiconductor). Examples of suitable III-V semiconductor materials include nitrides, such as gallium nitride, and phosphides, such as indium gallium phosphide. Other types of III-V materials can also be used, as well as materials from other groups of the periodic table. The component or chip can include electrical contacts suitable for application of power to energize the device. Examples include wire bonding, tape automated bonding (TAB), or flip-chip bonding. The individual layers and other functional elements of the component or chip are typically formed on the wafer scale, and the finished wafer can then be diced into individual piece parts to yield a multiplicity of LED dies. The LED die may be configured for surface mount, chip-on-board, or other known mounting configurations. Some packaged LEDs are made by forming a polymer encapsulant over an LED die and an associated reflector cup. The LED may be grown on one of several substrates. For example, GaN LEDs may be grown by epitaxy on sapphire, silicon, and gallium nitride. An "LED" for purposes of this application should also be considered to include organic light emitting diodes, commonly referred to as OLEDs.

In one aspect of the invention, the LED(s) 110 may be made from an array of two or more different color LEDs, for example red-green-blue (RGB) LEDs (e.g., a red LED in combination with a green LED in combination with a blue LED), or, alternatively, a combination of a red LED with a cyan LED. In another aspect, the LED(s) 110 may comprise one or more remote phosphor LEDs, such as those described in U.S. Pat. No. 7,091,653. In this manner, an appropriate balance of blue and yellow light can create white light output to the backlight light guide unit 300.

In another aspect, a blue GaN LED, a YAG phosphor, and collimating optical systems such as lenses and compound parabolic concentrators can be utilized as light source unit 100. An additional illuminator having a different color output can also be used in combination.

With the design of the system of the present invention, the light source 100 can utilize very high brightness and efficient LEDs, mix and match different discrete colors, and utilize remote phosphor-based LEDs. At the same time, the efficient conversion of light, through the preservation of etendue, can eliminate the need for a large number of LEDs to be utilized.

The light sources may produce homogenous colors, such as that from a phosphor converted LED, or may be a combination of colors. For example, the LEDs may be a combination of a blue LED with a green-emitting phosphor and a red emitting AlInGaP LED. The combination of the anamorphic light guide and the diverters has been found to provide sufficient path length for the light emitted from the LEDs to effectively mix the colors before entering the backlight light guide unit.

Referring back to FIGS. 2A-2C, in one exemplary aspect of the invention, light exiting the anamorphic light guide 210 can be received by a coupler 280 that links the converter unit 200 and the backlight light guide unit 300. The coupler 280 can be part of or separate from the converter unit 200. In this example, the coupler 280 will be described as being part of the converter unit 200. For example, as shown in FIGS. 2B and 2C, coupler 280 can be integrally formed with diverting elements 250 in a single piece construction.

As shown in more detail in FIGS. 2G and 2H, coupler 280 comprises a generally rectilinear body having a partial stepped profile along one side (e.g., input face 282) to receive the output of the anamorphic light guide and a line-shaped profile along the opposite side (e.g. output face 284) to couple light into the generally planar backlight light guide of unit 300. In particular, the partial stepped input face 282 of coupler 280 can comprise a series of faces (e.g., faces 282a-282e, each stepped in height by an amount corresponding to the thickness of each diverting element) that correspond to and register with the arrangement of output faces 254 of the diverting element 250. On the opposite side of coupler 280, output face 284 has a substantially line-shaped face and a thickness or height (h3) to substantially match the thickness of the backlight light guide portion (see light guide 310 in FIG. 5A) of the backlight light guide unit 300. Light is guided within coupler 280 via TIR. Thus, the coupler 280 is configured to substantially preserve the etendue of the anamorphic light guide, while correcting for the disparity in shape from a profile of thin, stepped faces to a generally line-shaped face.

As mentioned above, in one aspect of the invention, coupler 280 is integrally formed with diverter 250. In this aspect, the diverter 250 and coupler 280 may be made from a continuous molded article. Suitable materials of construction include acrylic resins, including polymethylmethacrylate (PMMA), curable acrylic resins, polystryrene, polycarbonate, polyesters, and silicones. Alternatively, coupler 280 can be formed using a cut strip of polymer film or by a cast and cure process.

In some cases, the area of the input to the planar light guide can be substantially larger than the output of the anamorphic light guide (by approximately 2×), thus the thickness of the planar light guide will be thicker than is needed from the perspective of etendue.

The etendue of the system may be preserved by matching the area of the backlight light guide to the output of the coupler 280. This matching may be done by either one or a combination of reducing the thickness of the backlight light guide to make it thinner than conventional backlight light guides or by tapering the profile of the coupler 280 such that output face 284 has a greater thickness than that of partial stepped input face 282. In some alternative aspects, the taper may be linear or the taper may be non-linear in at least one axis. A suitable non-linear profile may include a parabola.

A low refractive index layer can be disposed between the anamorphic light guide 210 and the diverter 250. The low refractive index layer may comprise a polymer coating or a coating applied by physical vapor or chemical vapor deposition. In a preferred aspect, the low index coating will have low scatter. Suitable coatings can include silica, $SiO_2$, and $MgF_2$.

Figure 5A:
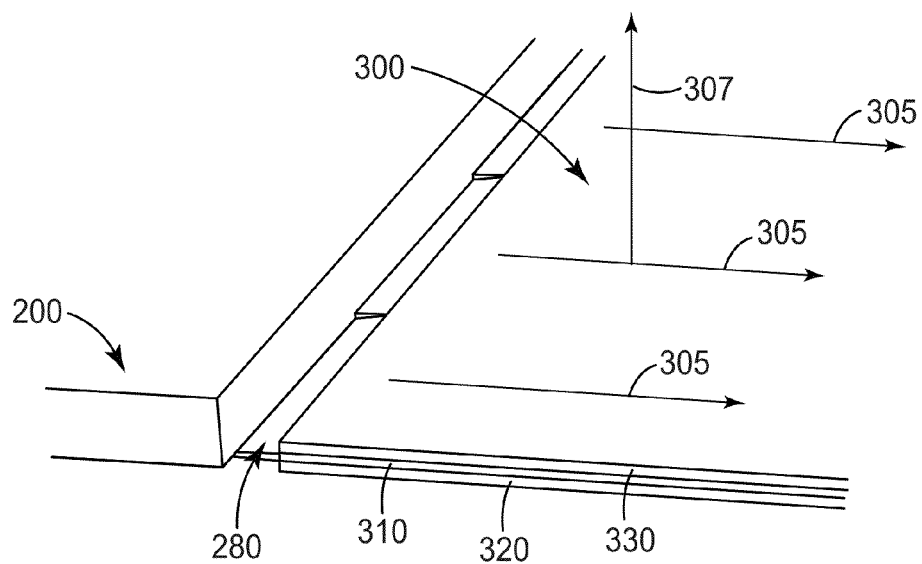
FIG. 5A is an isometric partial view of an exemplary backlight light guide according to another aspect of the invention.

In an aspect of the invention, light exiting coupler 280 enters backlight light guide unit 300, which further directs light towards a display. As shown in FIG. 5A, the backlight light guide unit 300 includes a generally planar structure having one or more layers. In one aspect, backlight light guide unit 300 includes a main or first (central) layer 310 disposed between a layer 330, and layer 320. The first (central) layer 310 can comprise a high index polymer layer, e.g., polycarbonate, polystyrene, or cured phenyl acrylates, that serves as the main backlight light guide. An array of extractors 315 (see e.g., FIGS. 6A, 6B) that direct light towards the viewing side of the device (in this example, towards the display panel), can be disposed on a bottom surface of layer 310. The second layer 330 can comprise a lower refractive index material, such as an optically clear adhesive (OCA). As an adhesive, in some aspects, layer 330 can be attached to an LCD module or an intermediate film, such as a brightness enhancement film. The layer 320 can comprise a reflective surface to act as a backside mirror.

Input light enters the first (central) layer 310 of backlight light guide unit 300 in the direction of arrow 305. In some aspects, layer 310 can have an index of refraction of about 1.55. Light can be deflected by the extractors in the direction of arrow 307 to provide illumination for the display panel (not shown). As the light exiting the converter unit 200 has a low etendue (e.g., less than 5), that light is well collimated entering layer 310. As a result, the index of refraction of layer 330 is not required to be substantially lower than that of layer 310 to maintain an effective waveguide structure. For example, in an aspect of the invention, layer 330 has an index of refraction of about 1.49. In other words, with the light guide design described herein, an air boundary on either side of layer 310 is not required to achieve an effective waveguide structure. In addition, the thickness of layer 310 can be substantially reduced (as compared to conventional backlight systems).

In one aspect, first (central) layer 310 comprises a material having a thickness of about 50 μm to about 500 μm. A preferred thickness may be based on the height of the collimating optics (e.g., CPC) used in the light source, where the thickness of layer 310 can be about ½ the height of the collimating optics. Layer 310 preferably has a generally rectangular shape, although in alternative aspects, layer 310 can be wedge-shaped. The reduced thickness of layer 310 represents a substantial improvement over conventional backlight systems and is about an order of magnitude less in size (thickness) than the size (e.g., height) of the LED light source. In conventional backlight systems, the main backlight light guide is typically surrounded on both major sides by an air surface or interface, as the widest range of TIR occurs in general when air acts as a light guide cladding. However, air cladding is not acceptable when the light guide is to be in physical contact with structural elements on one or both major sides of the backlight light guide. Previous approaches to this configuration are not optimal. These previous approaches include accepting greater light losses due to poorer TIR collection angle range and increasing the thickness of the backlight light guide to accept an increased height of a collimated light beam. These approaches fail to meet the demands of improved power efficiency and more compact systems.

The light source unit 100 and converter unit 200 described above substantially preserve etendue and produce light having a high aspect ratio (of 20:1 or greater) and good collimation. In a preferred aspect, the light emitted by the LED is collimated such that at least 25% of the light emitted by the LED is contained within a cone with a half-angle of no more that about 15°, more preferably within a cone of no more than about 10°. As a result, the thickness of the backlight light guide unit 300 can be substantially reduced (e.g., by about 2× or more). In addition, the low scatter of the entering light means that air cladding is not required and overall device thickness can be even further reduced.

Figure 5B:
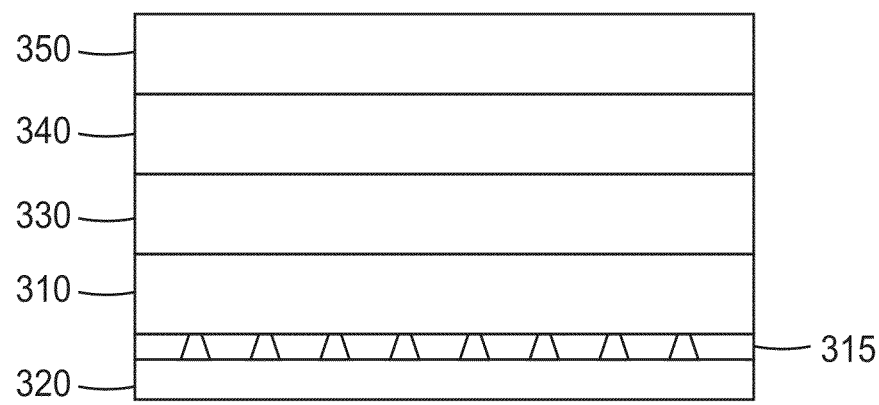
FIG. 5B is a schematic view of an exemplary backlight light guide unit according to another aspect of the invention.

In another aspect, such as is shown in FIG. 5B, the backlight light guide unit 300 includes a generally planar structure having the following layers: a light guide layer 310 having a surface that includes a spaced array of extractors, a backside reflective layer 320, a low refractive index coupling layer 330 disposed on the opposite major surface of layer 310, a quarter wave film layer 340 to shift the polarization of the incoming light by a quarter wavelength, and a reflective polarizer 350 to provide recycling of unused light.

LCDs transmit one polarization of light. Since most light sources are unpolarized, the polarized transmission in conventional LCDs leads to a significant loss of optical efficiency and increases the power usage of the display. In contrast, with the present design, such as shown in FIG. 5B, a reflective polarizer 350 can increase display efficiency by reflecting the light polarization back into the backlight, allowing some of the light to be converted into the useful polarization state by quarter wave film layer 340.

According to alternate aspects of the invention, two classes of approaches can be used to convert the reflected polarized light into the desired transmitted polarization. One approach is to use components in the backlight that randomize the polarization of the light. Using reflective polarizers with a scattering, lambertian-type reflector as a backside reflector, tends to depolarize the light. Suitable polarization randomizing reflective materials include metal coatings, dichroic coatings, and combinations thereof on optically thick and birefringent polymers such as polyethylene naphthalate and polyethylene terephthalate (PET). Semispecular reflectors may also be suitable, including oriented voided PET films. This configuration creates more reflections in the recycling cavity, and may reduce efficiency. An advantage of this type of reflector is reducing the number of optical components, such as the quarter-wave retarder.

A second approach, such as is shown in the aspect of the invention in FIG. 5B, is to use a specular (polarization-preserving) backside reflective layer with a quarter-wave retarder disposed between the backside reflective layer and the reflective polarizer. This second system approach can be more efficient than the first approach, which randomizes the polarization state. In this second approach, the optical components disposed between the backside reflector layer and the reflective polarizer layer should have very low optical birefringence to maximize output efficiency. Suitable polarization-preserving reflectors include metalized and inorganic dichroic reflectors, and combinations thereof disposed on a low birefringent material such as polymethylmethacrylate (PMMA) and other amorphous polymers.

In addition, due to the low etendue of the light source unit 100 and converter unit 200, the light passing through the quarter-wave film typically has a much narrower range of angles, which eliminates the need for an expensive, broad use-angle range quarter-wave film.

Suitable materials for low refractive index layer 330 include $SiO_2$, $MgF_2$, silicone polymers, fluoropolymers, acrylics, and mixtures thereof.

A simulation was performed comparing a conventional backlight system (1), that utilizes a lambertian-type scattering backside reflective layer, to a backlight system (2) such as shown in FIG. 5B, where layer 520 includes a 90% (reflective) specular reflector, layer 310 is formed from a transparent material with an array of extractors, a low index OCA layer 330, a quarter-wave retarder layer 340, and a reflective polarizer layer 350 (formed from APF, available from 3M Company). The reflector is bonded to the backside of the light guide, where, for this example, a thin low index coating can be applied to the backside of the light guide and extractor array (e.g., a physical vapor deposited $MgF_2$ or silica coating, followed by a coating of silver or aluminum). The backlight system (2) results in a more efficient system than backlight system (1), between 30% and 100% more efficient, depending on the usage of angular gain films. The greatest improvements in efficiency occur when the reference display uses angular gain films such as BEF film, available from 3M Company. The angular gain films typically are positioned in this example between the top surface of the light guide and below the reflective polarizer. The simulated efficiency differences were calculated using Lighttools software, available from Synopsis Corp.

Figure 6A:
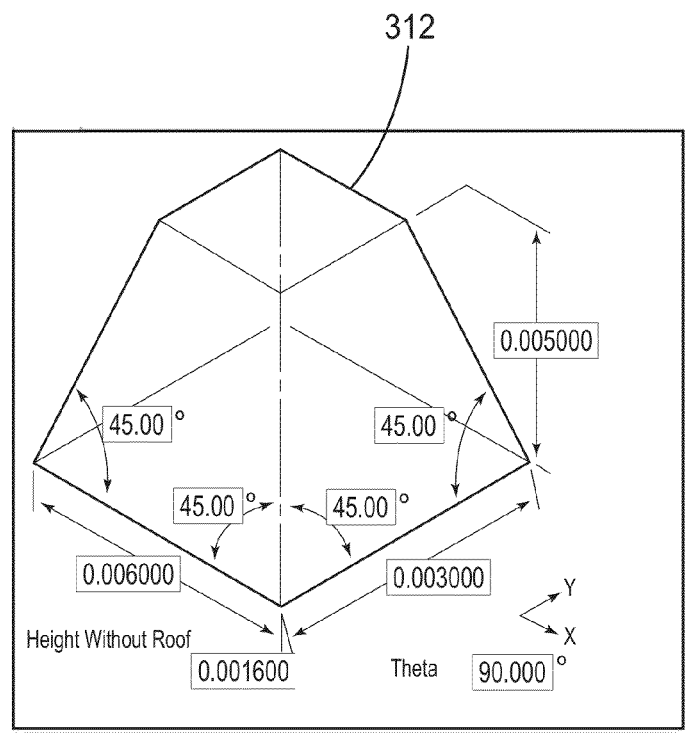
FIG. 6A is an isometric view of an exemplary extraction element according to another aspect of the invention.

FIG. 6A shows an exemplary extraction feature or extractor 312. Extractor 312 has a truncated pyramid or tooth-shape, with angled sides, that is designed to pick off light rays and deflect them at a substantially 90° angle toward the display unit (not shown). While the internal angles are shown in FIG. 6A as 45° angles, these internal angles may be lesser or greater angles, depending on the properties of the light being guided within backlight light guide 300. The extractor is formed in the light guide, and can use total internal reflection (TIR) to promote reflection, using air interfaces, and optionally in combination with dielectric thin film coatings, such as silica or magnesium fluoride. The extractors can be formed in the light guide through microreplication, where, for example, a radiation cured resin replicates a pattern on a metal tool surface onto a light guide film. Alternatively, the light guide can comprise a layer of glass. The extractors can comprise areas of texture on the light guide plate, where the texture controllably scatters light passing through the light guide plate. Alternatively, the extractors may comprise geometric features such as prisms. An example extraction feature is an array of prisms distributed over the surface of the light guide. The distribution provides the desired light output uniformity for the light guide. The prisms may be arranged in a one-dimensional array of, for example, concave right-angle prisms, with each prism being about 1.5 µm in height, 3 µm in length, and the width of the light guide, such that light is extracted from the light guide. The prisms may also be arranged as a two-dimensioned array, with the length of each prism being, for example, about 10 µm.

Figure 6B:
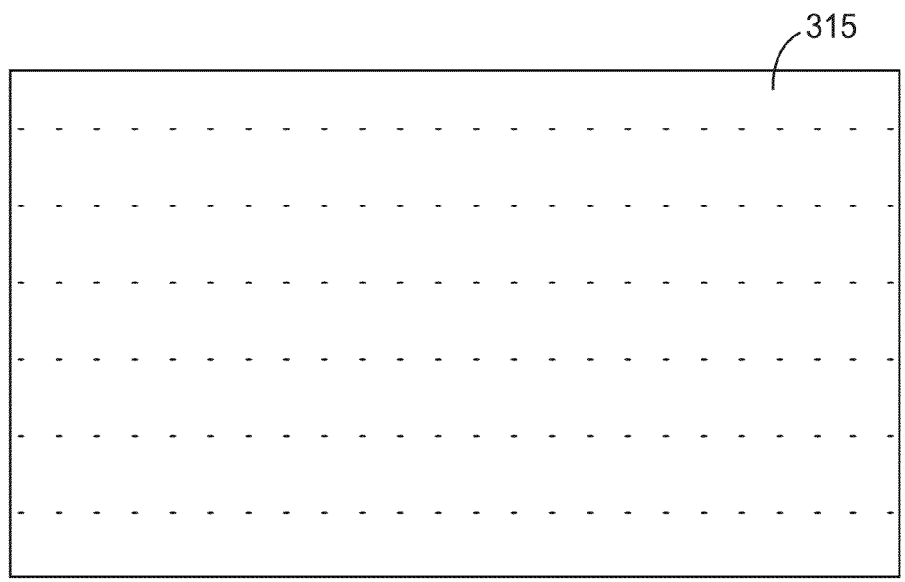
FIG. 6B is a top view of an exemplary extractor layer of a backlight light guide unit according to another aspect of the invention.

FIG. 6B shows a top view of extractor layer 315 showing the relatively wide spread spacing of each extraction unit. In this manner, each extractor of the extractor pattern covers an extremely small area of the backlight unit, thus promoting uniformity of the reflected light rays towards the display panel. In one aspect of the invention, the density of extractors is about less than 20% of the area of the light guide. In another aspect, the density of extractors is about less than 10% of the area of the light guide. As a result, light rays emitted by the backlight system are in a relatively small range of angles, a consequence of the low etendue design of the backlight system and the use of the extractors described herein. This low density of extractors allows the recycling polarizer arrangement of the embodiment of FIG. 5B to operate more efficiently because fewer extractors leads to less randomization of the light polarization. An exemplary process for forming the extractor layer 315 is described in further detail below.

According to simulations performed by the investigators, the addition of a reflective polarizer to a conventional backlight typically increases brightness by 50% to 70%. Using an example model system in LightTools version 7.2 (available from Synopys Inc., Mountain View, Calif., USA), a conventional BacklightSystems 3LEDBacklight shows a 72% increase in brightness by adding a simulated APF film. For a system configured similar to the embodiment such as shown in FIG. 5B, where layer 320 includes a 90% specular reflector, layer 310 is formed from a polymeric material with an index of 1.58 and having an array of extractors, a low index OCA layer 330, and a quarter-wave retarder layer 340, the addition of a reflective polarizer layer 350 (formed from APF, available from 3M company) results in a 93% increase in efficiency.

Thus, while conventional LCD backlights have a relatively low 60-70% gain using reflective polarizers, according to exemplary aspects of the invention, the backlight system described herein can provide an 80-90% gain. According to other aspects, the backlight light guide can have a low density of extraction features, a highly reflective back surface, and a reflective polarizer. The backlight light guide may use prismatic extraction features, and may include a quarter wave retardance film. The backlight may also contain a non-depolarizing diffuser.

According to another aspect of the invention, several components of the backlight unit described herein, including elements of the converter unit 200 and backlight light guide unit 300, can be formed using the following process. FIGS. 7A-7F are used to help illustrate the process.

Overall, the exemplary process includes providing a cavity having at least a first array of first optical elements and a second array of second optical elements that have a different shape than the first array. For example, in one aspect, the first array of optical elements can comprise the diverters and the second array of optical elements can comprise the backlight light guide unit with extractors. In another aspect, the second array of optical elements can comprise the coupling element. The process further includes filling the cavity with a curable resin. Another optical element, or secondary optical element, such as the anamorphic light guide, can be applied to the curable resin in alignment with the first optical array. The resin can then be cured. The cured assembly can then be removed from the cavity. In alternative aspects, a molding tool, such as a surface of the coupling element, can be applied to the same side of the first array as is the anamorphic light guide. The exemplary process may be continuous, using molds that are on a belt or a cylinder, semicontinuous, or batch.

Figure 7A:
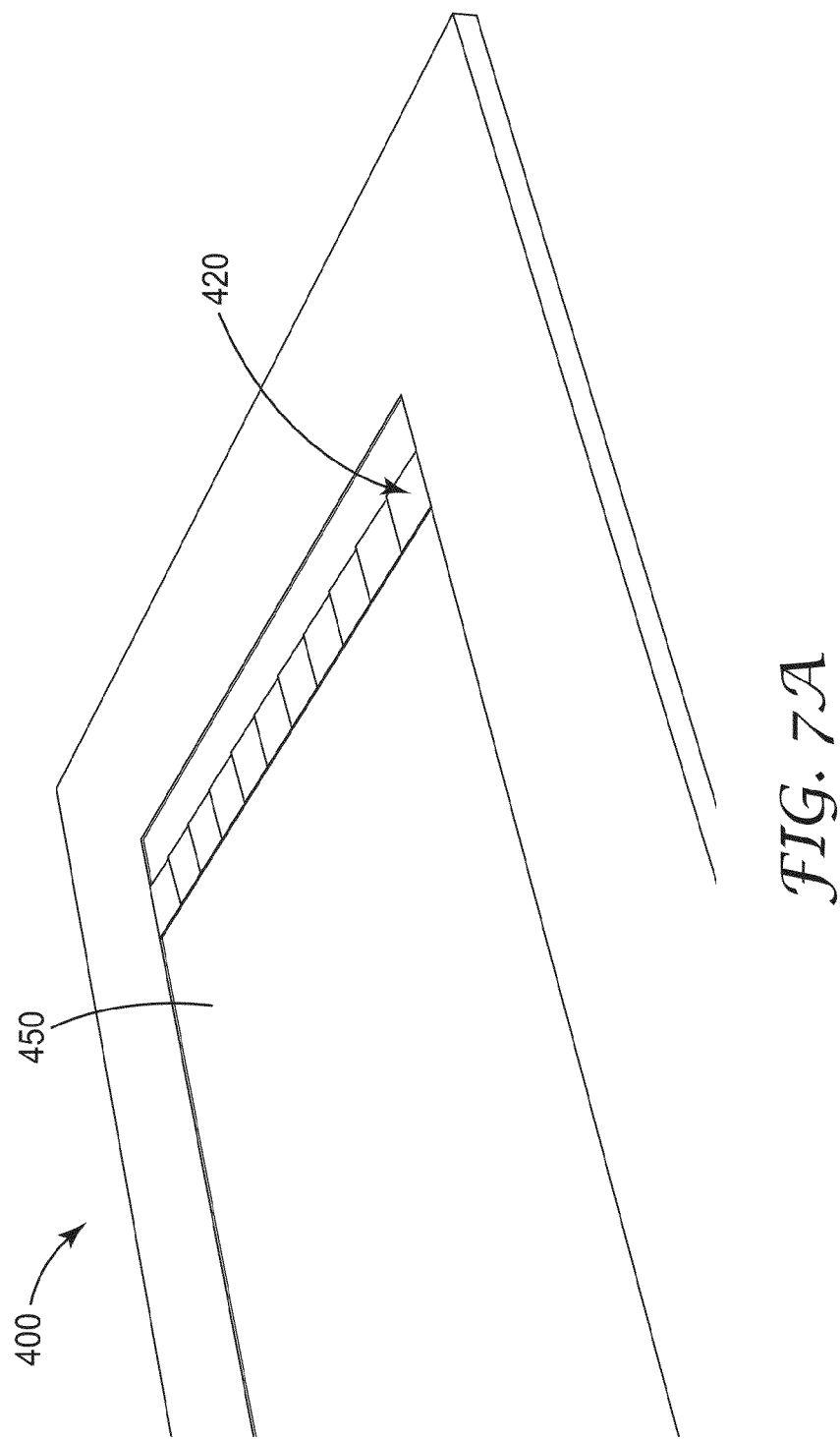
Figure 8:
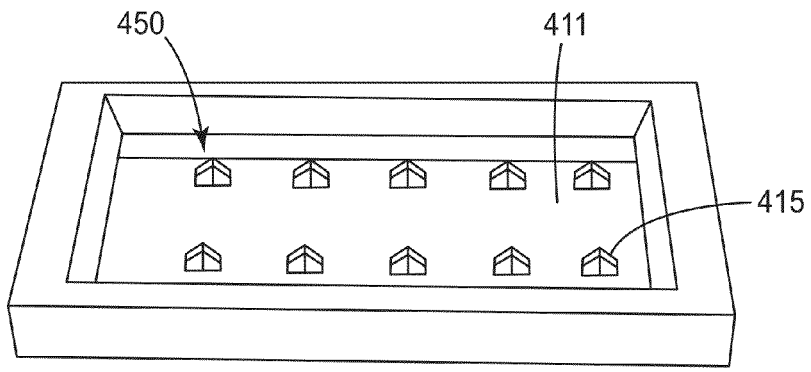
FIG. 8 is an isometric view of a mold used to form a backlight light guide with extraction features according to another aspect of the invention.

In more detail, in FIG. 7A, a molding surface or mold 400 is shown (in partial view) having a depressed area (e.g., cavity) with a negative image of desired optical element shapes. The negative image of the desired optical element shapes may be any indented or bumped shape, or combination of the two. The optical elements may be arrays or random shapes, and may include, for example, aspheres, spherical shapes, prisms, torus shapes, and channels. Mold 400 can be prepared by diamond turning or flycutting a master form and electroforming the mold. Mold 400 includes a section 420 that is configured to include the converter unit of the backlight guide (e.g., diverters, anamorphic light guide). For example, section 420 can include triangular shaped recesses. Section 450 is configured to include the backlight light guide. For example, section 450 can have a construction such as shown in FIG. 8 (shown in exaggerated scale), with an array of extractors or extractor layer 415, similar to extractor layer 315 described above, formed on a bottom surface 411 of the mold. A process that can be used to form the mold with the array of extractors 415 is described in further detail below.

In one aspect, the mold 400 can be configured to form a backlight guide for a mobile or handheld device. In other aspects, the process described herein can be utilized to form a backlight system for a larger display, such as a tablet, computer, or television display.

Optionally, the molding surface can be coated with a release agent, or a material that has desired optical characteristics, such as a lower index of refraction than a curable resin. This coating may remain with the mold or adhere to the curable resin once cured. Examples of such suitable coatings include diamond like coatings, silicones, acrylates, fluoropolymers, and physically vapor deposited materials.

Figure 7B:
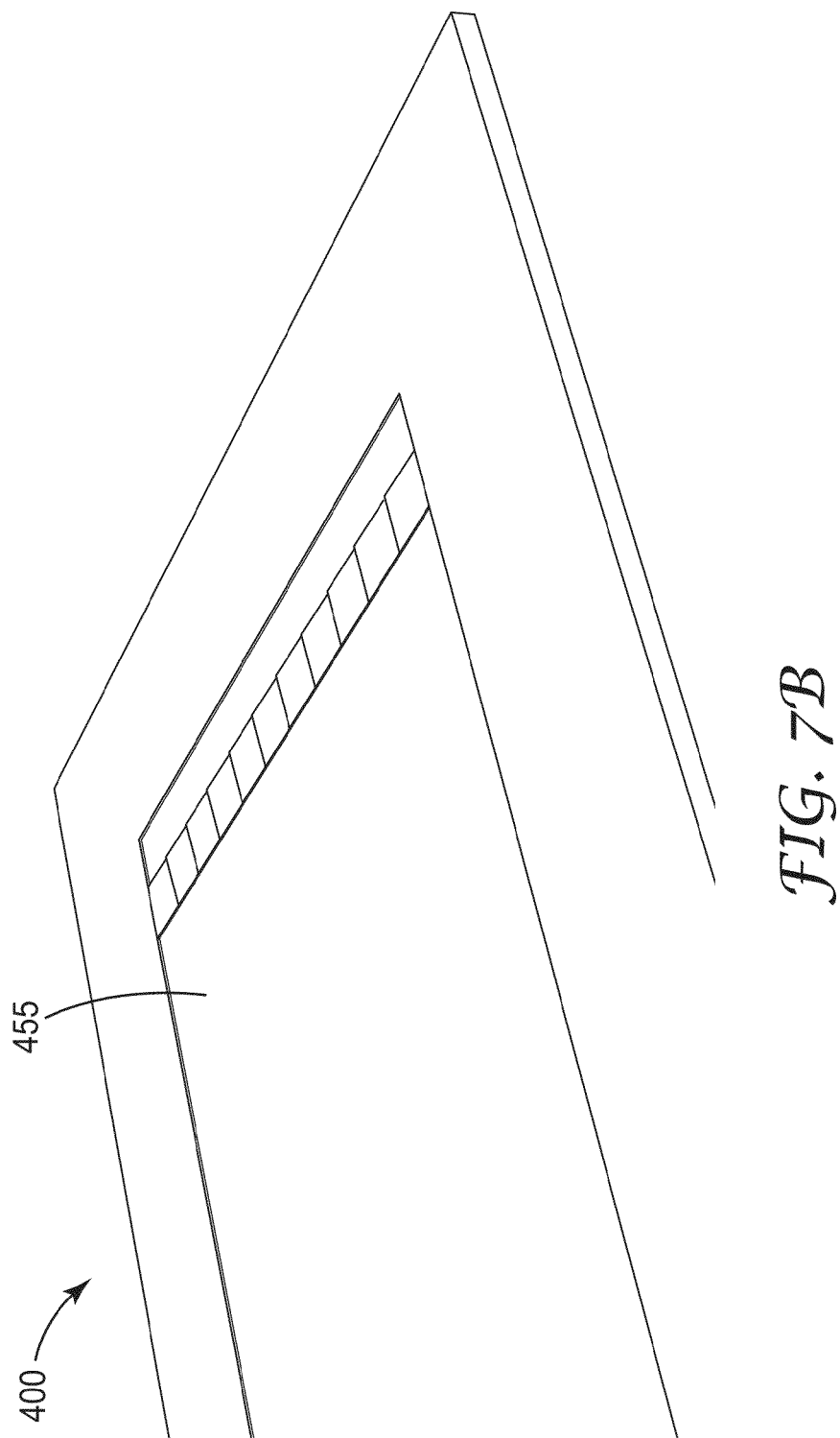

In FIG. 7B, the mold 400 is filled with a curable resin 455. The curable resin may be applied by dip coating, wire bar coating, doctor blade coating, ink jet coating, roll coating, silk screen coating, or any other coating process. The curable resin may be a single composition, or may vary by the region on the molding surface. Suitable resins include acrylates, silicones, epoxies, esters, vinyl compounds, and may include, for example acrylic acid, methyl methacylate, other monofunctional acrylates, polyfunctional acrylates, dimethyl silicone, methyl-phenyl silicone, fluoroacrylates, and mixtures thereof.

In FIG. 7C, a secondary optical element, such as the anamorphic light guide 210, can be placed onto the curable resin at section 420 in registry with the array of optical elements (e.g., diverters). The secondary optical element may be applied to the surface of the resin in an atmospheric environment, or in an inert gas environment such as nitrogen, helium, argon, or carbon dioxide. The optical element or the resin or both may be heated to reduce resin viscosity, and reduce the tendency to entrain gas. A pressure below atmospheric may also be used to reduce gas entrainment. The secondary optical element may be aligned with fiducials, or the features on the mold, or may be passively aligned with the features on the mold, or by a combination of the two or more processes. The height may be adjusted to reduce the meniscus between the optical element and the resin. The secondary optical element may be applied at the same time as the secondary molding structure, or may they may be applied separately.

Figure 7D:
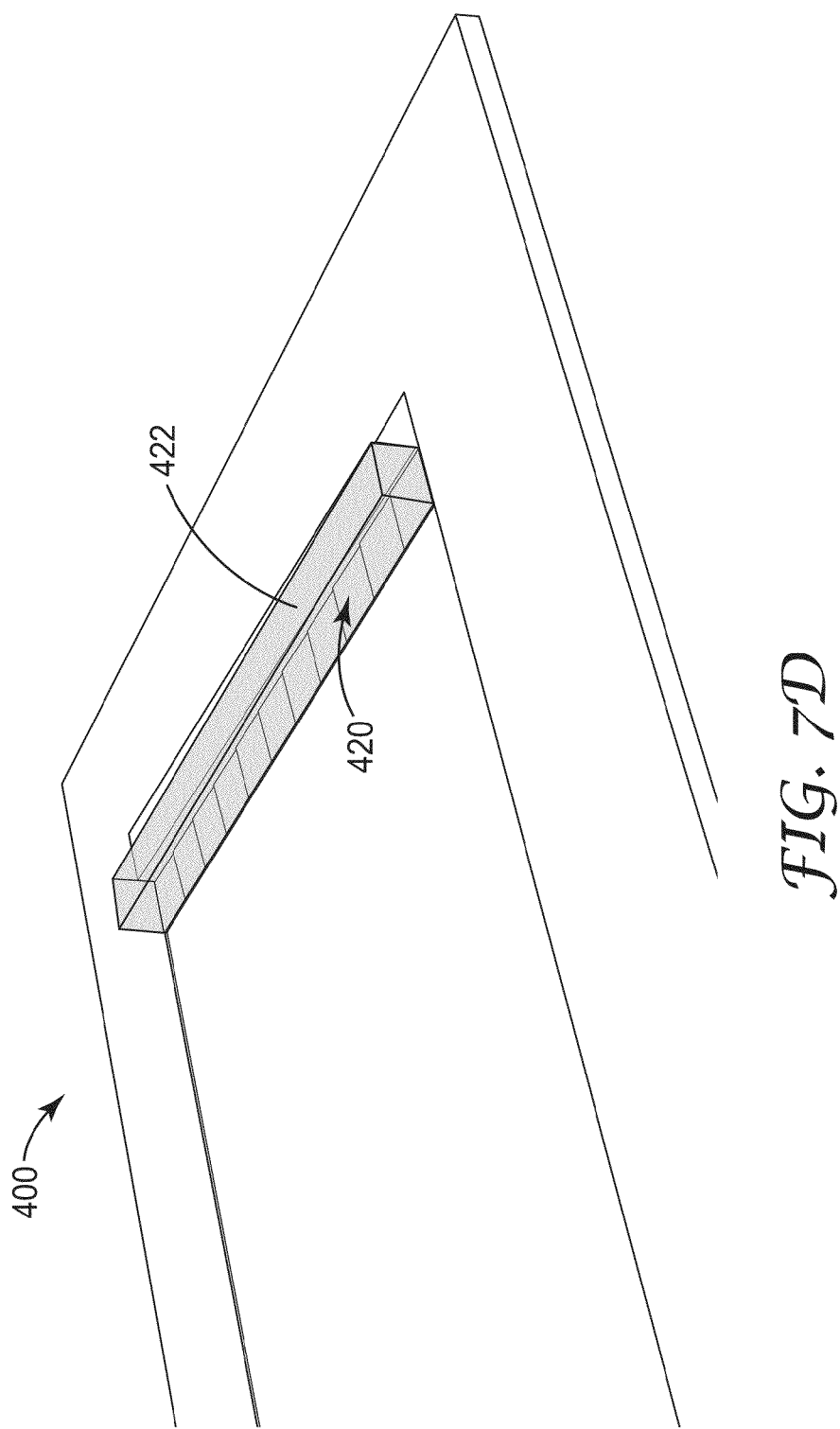

In FIG. 7D, one or more removable secondary molds are applied to the surface of the mold 400. In this example, secondary mold 422 is applied to section 420 of mold 400. Secondary mold 422 is preferably transparent to curing radiation, such as e-beam radiation. The optional removable secondary molds may be applied to some or all of the resin surface. The secondary molding surface may be aligned with fiducials, or the features on the mold, or may be passively aligned with the features on the mold, or by a combination of the two or more processes. The height may be adjusted to reduce the meniscus between the molding surface and the resin. In this example, the mold 422 can be shaped so as to form the coupling element (such as coupling element 280) after curing. In addition, optionally, a film can be applied to the surface of the mold 400 to assist in the removal of the secondary mold(s) after curing.

After placement of the removable secondary mold, the resin 455 is cured. The resin may be cured using a thermal initiator or catalyst, by thermally driven condensation, a photoinitiator, or by other actinic radiation including electron beams, or a combination of one or more of these processes. In one aspect, resin 455 is cured by radiation, such as e-beam radiation, using a conventional curing process. While UV and/or other light beam curing methods can be employed. Using e-beam radiation, as opposed to a UV curing process, can reduce potential light absorption issues.

Figure 7E:
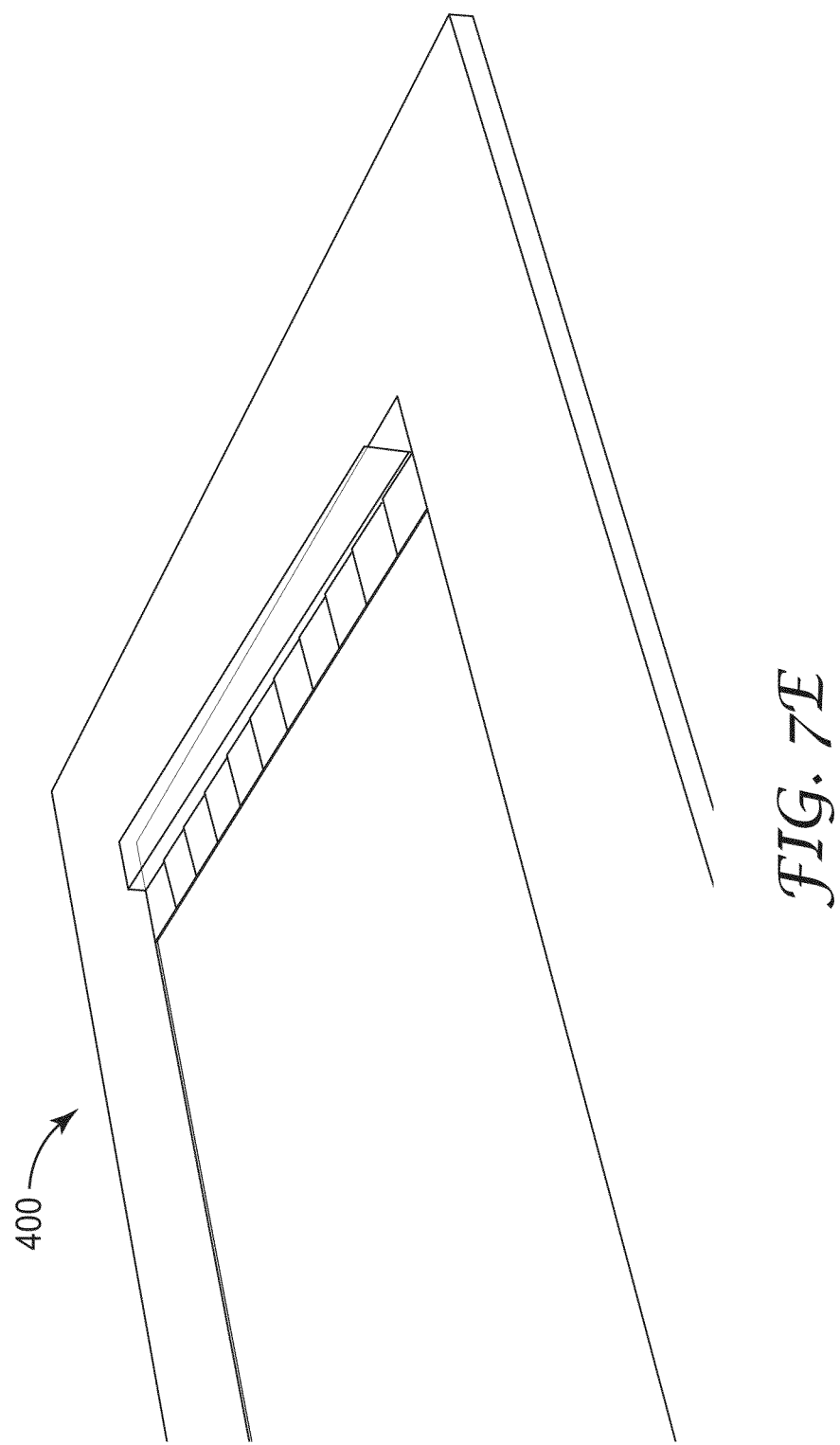

In FIG. 7E, mold 400 is shown after curing, with the secondary mold 422 removed.

Figure 7F:
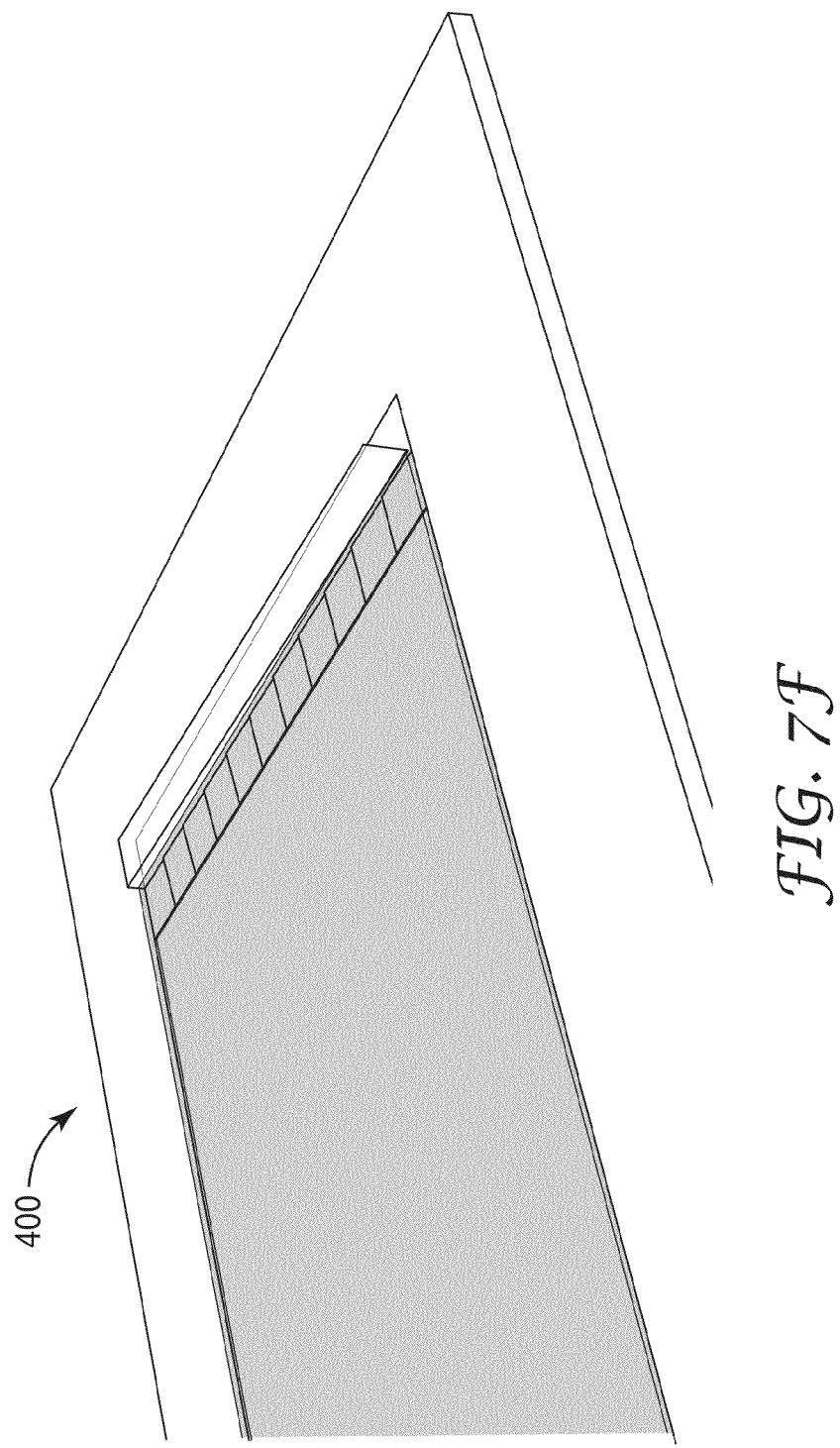

In FIG. 7F, an optically clear adhesive film, with a liner, can be applied to the top surface of the cured structure. The assembly, which includes the backlight light guide, coupling element, diverters, and anamorphic light guide can then be removed from the mold 400.

In addition, one or more surfaces of the cured resin structure and the secondary optical elements may be post-processed. Suitable post processes includes being physical vapor coated with dielectric materials such as $MgF_2$, $SiO_2$, or $Al_2O_3$, or metals including aluminum or silver, or combinations of dielectrics and metals. In one aspect, a suitable combination includes a coating of a low index dielectric material such as $MgF_2$ or $SiO_2$ followed by a coating of aluminum or silver. The low refractive index dielectric coating increases reflectivity at high angles, and is transparent at higher angles allowing the metal to effectively reflect light.

After removal and/or post processing, the assembly can then be bonded to an upper or lower display surface (not shown).

Thus, the above process can be utilized to produce one or more elements of the backlight light guide system 10 shown in FIG. 1.

As mentioned above, the backlight light guide includes an array of extractors or extractor layer that redirects light toward the display in a uniform manner. FIGS. 9A-9F below illustrate an exemplary process that can be utilized. In this exemplary process, a surface is provided, where an array of grooves are formed on the surface. The grooves are filled with a polymer, which can be planarized. The polymer can be further defined through a combination of patterned radiation and etching. Electroforming can be used to form a replica of the surface with the selected portions of the grooves, where the sides of the grooves can have an angle of at least 45 degrees to the plane of the light guide. The resulting lightguide can have a major surface with light (low density) extraction features (i.e., extractors), where the extraction features occupy less than 10% of the area of the major surface.

Figure 9A:
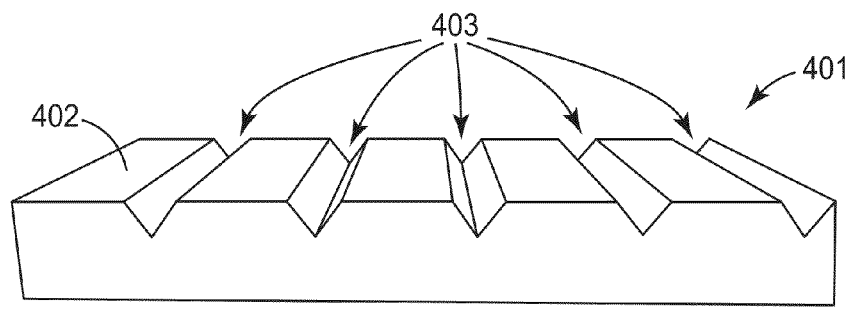
FIGS. 9A-9F are several views illustrating an exemplary process to form a mold having extraction features according to another embodiment of the invention.

FIG. 9A shows an isometric view of a substrate 401 having a series of grooves 403 formed in an upper surface 402 thereof. The substrate 401 can be formed from a metal, such as copper or nickel, or alloys thereof. The grooves 403 can be formed using a conventional cutting process, such as a diamond cutting process.

Figure 9B:
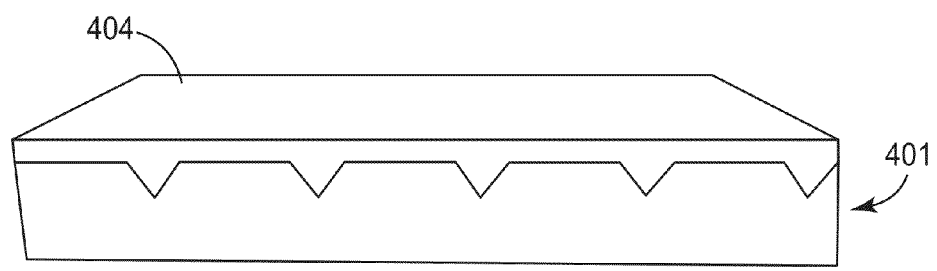

FIG. 9B shows substrate 401 coated with a polymer layer 404, which fills the grooves formed in the upper surface 402. The polymer layer 404 may comprise any one or a mixture of materials. In one aspect, the polymer layer 404 comprises a photoresist. Alternatively, polymer layer 404 may comprise a polymer that is etchable, such as by a conventional e-beam, reactive ion, or similar etching process.

Figure 9C:
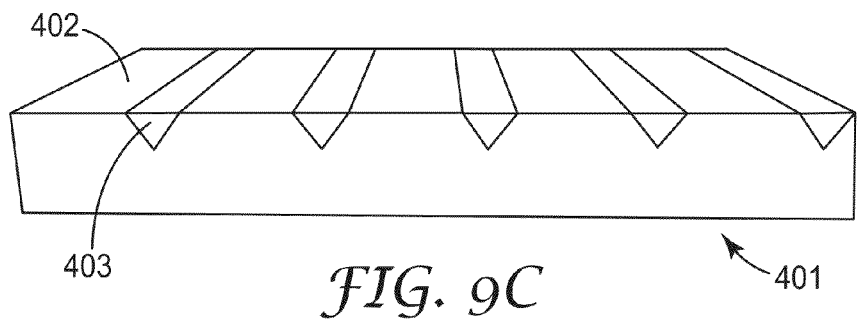

Optionally, the polymer-coated substrate can then be planarized, as is illustrated in FIG. 9C. With this step, polymer/resist can remain in the previously formed grooves, while the remaining polymer/resist is removed from the upper surface 402. Suitable conventional processes for planarization include, for example, abrasive polishing and chemical mechanical polishing (CMP). The planarization can increase the smoothness of the completed light guide. Planarization may not be required in some applications.

Figure 9D:
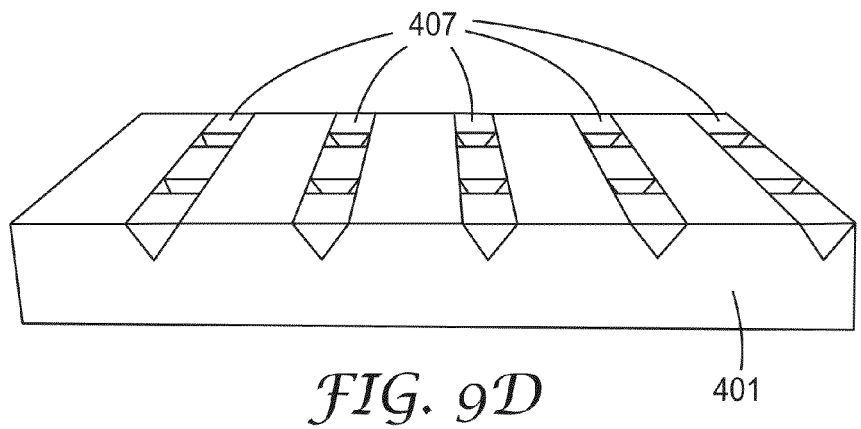

The polymer/resist (planarized or not) layer 404 can then be exposed to patterned radiation. Alternatively, the polymer layer 404 may be covered with a patterned etch barrier, and the polymer layer may be patterned through reactive ion etching. FIG. 9D shows the substrate 401 after the etching step is completed.

In some aspects, the etched faces of the extractor features intersecting the major surface of the light guide may have a high angle and may be nearly perpendicular to the major surface. A small deviation in the angle from normal can be utilized in some aspects to facilitate releasing of the tool surfaces after electroforming. The etch surfaces 407 are also preferably smooth and do not substantially scatter light. In some applications, it may be preferred to have the etched faces perpendicular, or even undercut. In some aspects, the etched faces have an angle of between 90 and 60 degrees from the major surface, more preferably, the angle is between 85 and 60 degrees, and most preferably the angle is between 80 and 70 degrees from the major surface.

Figure 9E:
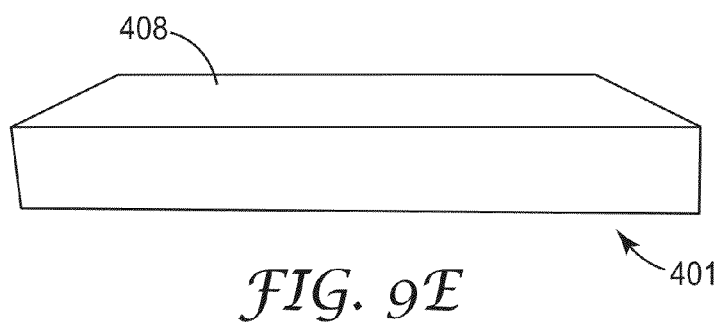

The etched substrate can then be coated with a metal layer, and electroformed with another metal, such as nickel, copper, or alloys containing nickel or copper, or both. FIG. 9E shows the completed electroform 408 that is formed over substrate 401.

Figure 9F:
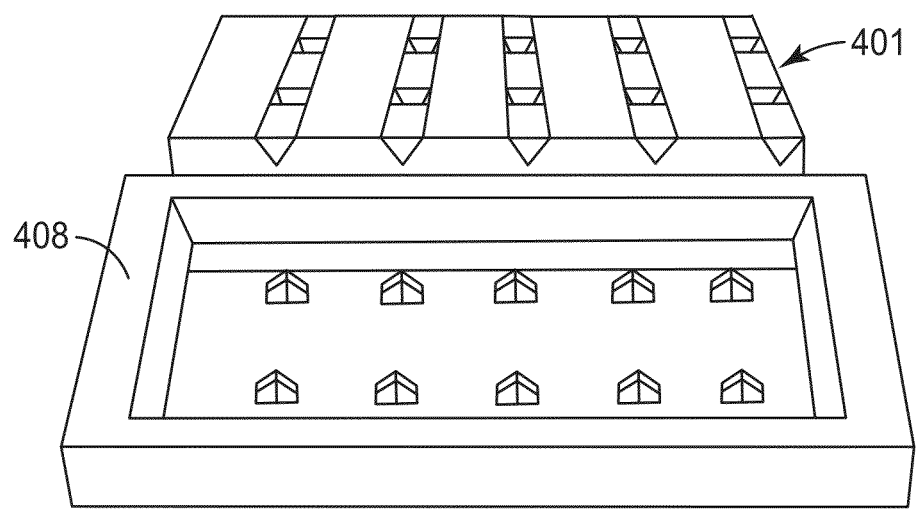

FIG. 9F shows the electroform 408 after separation from the substrate. Either the substrate 401 or the first electroform 408 may be used for subsequent electroforming steps to form additional tools for cast and cure or injection molding operations.

Thus, the backlight system and components thereof described above provide an efficient lighting system for a display. The backlight system and its components, taken together or separately provide a highly efficient lighting system with low etendue and a reduced number of overall components. With the backlight system described here the need for air spaces can be eliminated, providing the opportunity for pressure sensing touch displays and haptics. The backlight system can be thinner than conventional backlights, allowing lamination with optically clear adhesive. In addition, the need for angular enhancement films is eliminated.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein.

The invention claimed is:

1. A method of forming a lighting system, comprising:
providing a cavity having at least a first array of first optical elements and a second array of second optical elements that have a different shape than the first array;
filling the cavity with a curable resin;
applying a secondary optical element to the curable resin in alignment with the first optical array;
curing the resin to form a cured assembly; and
removing the cured assembly from the cavity.

2. The method of claim 1, further comprising applying a molding tool to a same side of the first array as is the secondary optical element.

3. The method of claim 1, wherein the method is a continuous process.

4. The method of claim 1, wherein the method is a batch process.

5. The method of claim 1, wherein the cavity comprises a depressed area formed in a mold having a molding surface.

6. The method of claim 5, further comprising applying a release agent to the molding surface.

7. The method of claim 6, wherein the release agent comprises at least one of a diamond like coating, silicone, acrylate, fluoropolymer, and a vapor deposited material.

8. The method according to claim 1, wherein the curable resin is applied by at least one of dip coating, wire bar coating, doctor blade coating, ink jet coating, roll coating, and silk screen coating.

9. The method according to claim 1, wherein the curable resin comprises at least one of acrylates, silicones, epoxies, esters, and vinyl compounds.

10. The method according to claim 1, wherein the first array of first optical elements comprises an array of diverter elements.

11. The method according to claim 1, wherein the second array of second optical elements comprises a backlight light guide having an array of extractors.

12. The method according to claim 1, wherein the second array of second optical elements comprises an optical coupling element.

13. The method according to claim 1, wherein the secondary optical element comprises an anamorphic light guide.

14. The method according to claim 1, wherein the curing comprises at least one of thermal curing using a thermal initiator or catalyst, thermally driven condensation, radiation curing using a photoinitiator, actinic radiation curing, and electron beam curing.

15. The method according to claim 1, wherein, after curing, applying an optically clear adhesive film to a top surface of the cured structure.

16. The method according to claim 1, wherein, after curing, vapor coating the cured structure with at least one of a dielectric material and a metal.

17. The method according to claim 1, further comprising bonding the lighting system to a display.

18. A method of forming an extractor optical element having extraction features, comprising:
providing a substrate material having an upper surface having an array of grooves formed thereon;
filling the grooves with a polymer;
defining the polymer using a patterned radiation and etching process;
electroforming the substrate material to form a replica of the patterned upper surface with selected portions of the grooves, where the sides of the grooves can have an angle of at least 45 degrees to the plane of the upper surface; and
removing the substrate from the electroform.

19. The method of claim 18, wherein the density of extraction features comprises about 10% or less of the area of a major surface of the electroform.

20. The method of claim 18, further comprising planarizing the polymer.

* * * * *

UNITED STATES PATENT AND TRADEMARK OFFICE
CERTIFICATE OF CORRECTION

PATENT NO.       : 9,039,905 B2                                         Page 1 of 1
APPLICATION NO.  : 13/769459
DATED            : May 26, 2015
INVENTOR(S)      : Andrew Ouderkirk It is certified that error appears in the above-identified patent and that said Letters Patent is hereby corrected as shown below:

<u>Column 8</u>
Line 67, Delete "polystryrene," and insert -- polystyrene, --, therefor.

<u>Column 12</u>
Line 26, Delete "Synopys" and insert -- Synopsys --, therefor.

<u>Column 13</u>
Line 43, Delete "methacylate," and insert -- methacrylate, --, therefor.

Signed and Sealed this
Twenty-third Day of August, 2016

Michelle K. Lee
*Director of the United States Patent and Trademark Office*